US012381333B2

(12) United States Patent
Kum et al.

(10) Patent No.: US 12,381,333 B2
(45) Date of Patent: Aug. 5, 2025

(54) ANTENNA UNIT COMPRISING METAL PLATE AND ANTENNA FILTER UNIT

(71) Applicant: Samsung Electronics Co., Ltd., Gyeonggi-do (KR)

(72) Inventors: Junsig Kum, Gyeonggi-do (KR); Seungtae Ko, Gyeonggi-do (KR); Jungyub Lee, Gyeonggi-do (KR); Yonghun Cheon, Gyeonggi-do (KR); Bonmin Koo, Gyeonggi-do (KR); Youngju Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 17/913,656

(22) PCT Filed: Mar. 29, 2021

(86) PCT No.: PCT/KR2021/003845
§ 371 (c)(1),
(2) Date: Sep. 22, 2022

(87) PCT Pub. No.: WO2021/201529
PCT Pub. Date: Oct. 7, 2021

(65) Prior Publication Data

US 2023/0111873 A1 Apr. 13, 2023

(30) Foreign Application Priority Data

Mar. 30, 2020 (KR) ........................ 10-2020-0037993

(51) Int. Cl.
*H01Q 21/06* (2006.01)
*H01Q 1/24* (2006.01)
*H01Q 21/00* (2006.01)

(52) U.S. Cl.
CPC .......... *H01Q 21/061* (2013.01); *H01Q 1/246* (2013.01); *H01Q 21/0087* (2013.01)

(58) Field of Classification Search
None
See application file for complete search history.

(56) References Cited

U.S. PATENT DOCUMENTS 10,084,231 B2 9/2018 Emerick et al.
11,088,731 B2 8/2021 Kim et al.
(Continued)

FOREIGN PATENT DOCUMENTS

CN 107706544 2/2018
CN 109994820 A * 7/2019 ............... H01Q 1/36
(Continued)

OTHER PUBLICATIONS

PCT/ISA/210 Search Report issued on PCT/KR2021/003845, Jul. 12, 2021 pp. 6.
(Continued)

*Primary Examiner* — Dameon E Levi
*Assistant Examiner* — Anh N Ho
(74) *Attorney, Agent, or Firm* — The Farrell Law Firm, P.C.

(57) ABSTRACT

The present invention relates to an antenna unit, and more particularly, to an antenna unit comprising a metal plate and an antenna filter unit. The present disclosure provides an antenna unit including a metal plate into which a stand-off head is inserted. The present disclosure provides an antenna unit including a metal plate having formed therein a groove for covering a circuit of a calibration network. The present disclosure provides an antenna unit including a filter unit having formed therein a groove for covering a circuit of a calibration network. The present disclosure provides an antenna unit comprising plastic rivets for coupling an antenna, a metal plate, and a calibration network. The present disclosure provides an antenna unit including a metal plate having a transmission line formed thereon.

17 Claims, 21 Drawing Sheets

(56) References Cited

U.S. PATENT DOCUMENTS

| | | | | |
|---|---|---|---|---|
| 2017/0170549 | A1* | 6/2017 | Buondelmonte | H01Q 21/0075 |
| 2017/0181263 | A1* | 6/2017 | Al-Momani | G06F 1/20 |
| 2017/0187105 | A1* | 6/2017 | Emerick | H01Q 21/22 |
| 2018/0316086 | A1* | 11/2018 | Lehman | H04W 76/40 |
| 2019/0267701 | A1 | 8/2019 | Kim et al. | |
| 2019/0268046 | A1* | 8/2019 | Kim | H01Q 25/001 |
| 2021/0005962 | A1 | 1/2021 | Han et al. | |
| 2021/0126351 | A1* | 4/2021 | Hou | H01Q 1/02 |
| 2023/0019212 | A1* | 1/2023 | Wang | H01Q 19/10 |

FOREIGN PATENT DOCUMENTS

| | | | | |
|---|---|---|---|---|
| CN | 110011072 | | 7/2019 | |
| CN | 110224231 | A * | 9/2019 | H01Q 21/00 |
| CN | 110350320 | | 10/2019 | |
| JP | 2016158095 | A * | 9/2016 | H01P 3/088 |
| KR | 10-2018-0055772 | | 5/2018 | |
| KR | 10-1855133 | | 5/2018 | |
| KR | 10-2018-0098391 | | 9/2018 | |

OTHER PUBLICATIONS

PCT/ISA/237 Written Opinion issued on PCT/KR2021/003845, Jul. 12, 2021, pp. 4.

Korean Office Action dated Mar. 20, 2024 issued in counterpart application No. 10-2020-0037993, 9 pages.

Korean Office Action dated Nov. 19, 2024 issued in counterpart application No. 10-2020-0037993, 9 pages.

* cited by examiner

ANTENNA UNIT COMPRISING METAL PLATE AND ANTENNA FILTER UNIT

PRIORITY

This application is a National Phase Entry of PCT International Application No. PCT/KR2021/003845, which was filed on Mar. 29, 2021, and claims priority to Korean Patent Application No. 10-2020-0037993, which was filed on Mar. 30, 2020, the entire content of each of which is incorporated herein by reference.

TECHNICAL FIELD

The disclosure relates to an antenna unit and, more particularly, to an antenna unit including a metal plate and an antenna filter unit.

BACKGROUND ART

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), nonorthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

DISCLOSURE

Technical Problem

The disclosure is to provide an antenna unit including a metal plate into which the head of a stand-off is inserted.

The disclosure is to provide an antenna unit including a metal plate in which a groove is formed to cover the circuit of a calibration network PCB.

The disclosure is to provide an antenna unit including a filter unit in which a groove is formed to cover the circuit of a calibration network PCB.

The disclosure is to provide an antenna unit including a plastic rivet for combining an antenna PCB, a metal plate, and a calibration network PCB.

The disclosure is to provide an antenna unit including a metal plate on which a transmission line is formed.

Technical Solution

The disclosure discloses an antenna unit. The antenna unit includes: a radio unit (RU) printed circuit board (PCB); a filter unit disposed on one surface of the RU PCB; a calibration network PCB disposed on one surface of the filter unit; a metal plate disposed on one surface of the calibration network PCB; an antenna PCB disposed on one surface of the metal plate; and an antenna array mounted on one surface of the antenna PCB.

The metal plate may include a stand-off. The calibration network PCB may include a hole through which the stand-off passes. The filter unit may include a screw that penetrates portions of one surface and the other surface of the filter unit and is coupled to the stand-off. The stand-off and the screw may fix and couple the metal plate, the calibration network PCB, and the filter unit.

The stand-off may include a head and a body.

The metal plate may include an insertion region into which the head of the stand-off is inserted.

The metal plate may include a transmission line electrically connected to the filter unit, the calibration network PCB, the antenna PCB, and the antenna array.

The metal plate may include a ground plane and a substrate disposed on one surface of the ground plane. The transmission line may be disposed on one surface of the substrate.

The metal plate may include a first ground plane, a substrate disposed on one surface of the first ground plane, and a second ground plane disposed on one surface of the substrate. The transmission line may be inserted into the interior of the substrate.

The calibration network PCB may include a circuit formed on the one surface of the calibration network PCB.

The metal plate may include a groove that is formed on the other surface of the metal plate to shield the circuit.

The calibration network PCB may include a circuit formed on the other surface of the calibration network PCB.

The filter unit may include a groove that is formed on the one surface of the filter unit to shield the circuit.

The antenna unit may further include a plastic rivet. The calibration network PCB may include a calibration hole coupled to the plastic rivet. The metal plate may include a metal hole coupled to the plastic rivet. The antenna PCB may include an antenna hole coupled to the plastic rivet. The plastic rivet may fix and couple the calibration network, the metal plate, and the antenna PCB.

The plastic rivet may include a plurality of rivets. The plastic rivet may be arranged in a mesh shape in a region of the one surface of the antenna PCB except for a region in which the antenna array is disposed.

The antenna unit may further include an adhesive member that is disposed between the one surface of the metal plate and the other surface of the antenna PCB to bond the one surface of the metal plate and the other surface of the antenna PCB.

The antenna unit may further include a metal shield can disposed between the one surface of the RU PCB and the other surface of the filter unit.

The RU PCB may include an RU connection terminal formed on the one surface of the RU PCB. The filter unit may include a filter connection terminal that is formed on the other surface of the filter unit and is electrically connected to the RU connection terminal.

The RU PCB may include an RU connection terminal formed on the one surface of the RU PCB. The filter unit may include a filter hole exposing the RU connection terminal. The calibration network PCB may include a calibration connection terminal that is formed on the other surface of the calibration network PCB and is electrically connected to the RU connection terminal through a space of the filter hole.

The filter unit may include a filter connection terminal formed on the one surface of the filter unit. The calibration network PCB may include a calibration connection that is formed on the other surface of the calibration network PCB and is electrically connected to the filter connection terminal.

The calibration network PCB may include a calibration connection terminal formed on the one surface of the calibration network PCB. The metal plate may include a metal plate hole that penetrates through the one surface and the other surface of the metal plate to expose the calibration connection terminal. The antenna PCB may include an antenna PCB hole that penetrates through the one surface and the other surface of the antenna PCB to expose the calibration connection terminal.

The length of the diameter of the metal plate hole may be the same as the length of the diameter of the antenna PCB hole.

Advantageous Effects

According to the disclosure, due to the structure of an antenna unit including a metal plate into which the head of a stand-off is inserted, the overall thickness of the antenna unit can be reduced.

According to the disclosure, due to the structure of an antenna unit including a metal plate in which a groove is formed to cover the circuit of a calibration network PCB, it is possible to effectively shield the leakage current of the antenna unit.

According to the disclosure, due to the structure of an antenna unit including a filter unit in which a groove is formed to cover the circuit of a calibration network PCB, it is possible to effectively shield the leakage current of the antenna unit.

According to the disclosure, due to the structure of an antenna unit including a plastic rivet for combining an antenna PCB, a metal plate, and a calibration network PCB, it is possible to improve the coupling characteristics and robustness of the antenna unit.

According to the disclosure, due to the structure of an antenna unit including a metal plate on which a transmission line is formed, it is possible to reduce the overall thickness of the antenna unit.

MODE FOR DISCLOSURE

Figure 1:
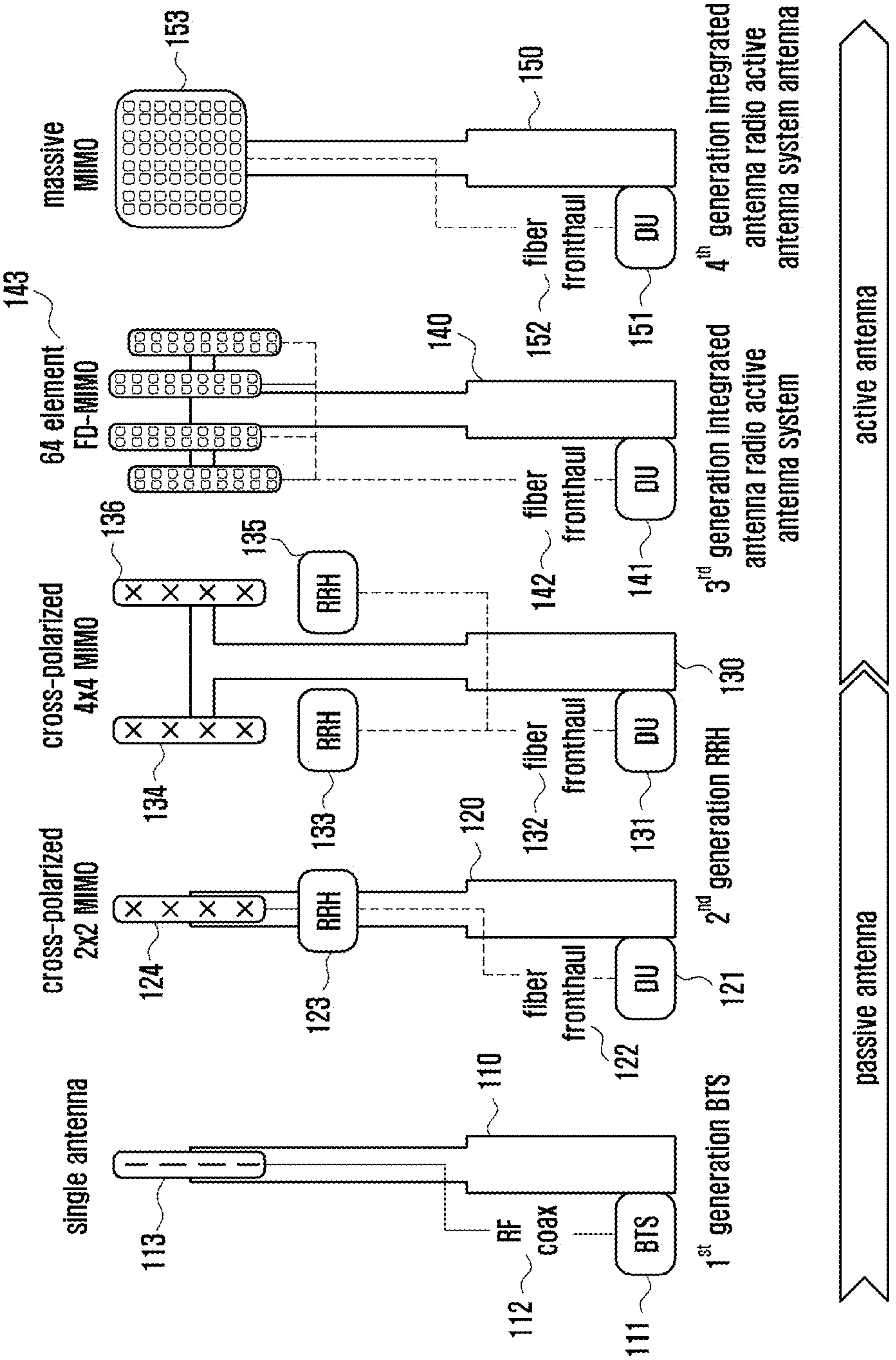
FIG. 1 is a conceptual diagram illustrating antenna structures of an electronic device according to an embodiment of the disclosure.

In the following description of embodiments of the disclosure, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. Also, in an embodiment, a "unit" or the like may include one or more processors.

FIG. 1 is a conceptual diagram illustrating antenna structures of an electronic device according to an embodiment of the disclosure.

With reference to FIG. 1, the electronic device according to an embodiment of the disclosure may be one of various types of base stations. For example, a first base station 110 may include a base transceiver station (BTS) 111, a radio frequency (RF) coax 112, and a single antenna 113. The BTS 111 and the single antenna 113 may be electrically connected through the RF coax 112. The first base station 110 may be referred to as a first generation base station.

A second base station 120 may include a digital unit (DU) 121, a fiber fronthaul 122, a remote radio head (RRH) 123, and a cross polarized 2×2 multi-input multi-out (MIMO) antenna 124. The DU 121 and the RRH 123 may be electrically connected through the fiber fronthaul 122. The RRH 123 and the cross-polarized 2×2 MIMO antenna 124 may be electrically connected. The DU 121 and the cross-polarized 2×2 MIMO antenna 124 may be electrically connected through the RRH 123. The DU 121 may be referred to as a baseband unit. The RRH 123 may be referred to as a radio unit (RU).

A third base station 130 may include a DU 131, a fiber fronthaul 132, a first RRH 133, a first cross-polarized antenna 134, a second RRH 135, and a second cross-polarized antenna 136. Each of the first cross-polarized antenna 134 and the second cross-polarized antenna 136 may be the same as or similar to the cross-polarized 2×2 MIMO antenna 124. The combined structure of the first cross-polarized antenna 134 and the second cross-polarized antenna 136 may be referred to as a cross-polarized 4×4 MIMO antenna. The DU 131, the first RRH 133, and the second RRH 135 may be electrically connected through the fiber fronthaul 132. The first RRH 133 may be electrically connected to the first cross-polarized antenna 134. The DU 131 and the first cross-polarized antenna 134 may be electrically connected through the first RRH 133. The second RRH 135 may be electrically connected to the second cross-polarized antenna 136. The DU 131 and the second cross-polarized antenna 136 may be electrically connected through the second RRH 135.

The second base station 120 and the third base station 130 may be referred to as a second-generation base station. The first base station 110, the second base station 120, and the third base station 130 may be referred to as a passive antenna base station.

A fourth base station 140 may include a DU 141, a fiber fronthaul 142, and a 64 element full-dimensional (FD) MIMO antenna 143. The DU 141 and the 64 element FD MIMO antenna 143 may be electrically connected via the fiber fronthaul 142. The fourth base station 140 may be referred to as a third generation base station.

A fifth base station 150 may include a DU 151, a fiber fronthaul 152, and a massive MIMO antenna 153. The DU 151 and the massive MIMO antenna 153 may be electrically connected through the fiber fronthaul 152. The fifth base station 150 may be referred to as a fourth generation base station.

The fourth base station 140 and the fifth base station 150 may be referred to as an integrated antenna radio active antenna system. The fourth base station 140 and the fifth base station 150 may be referred to as an active antenna base station.

Meanwhile, the massive MIMO antenna 153 may be referred to as a massive MIMO unit (MMU). The MMU 153 according to an embodiment of the present disclosure may have a shape as shown in FIG. 2.

Figure 2:
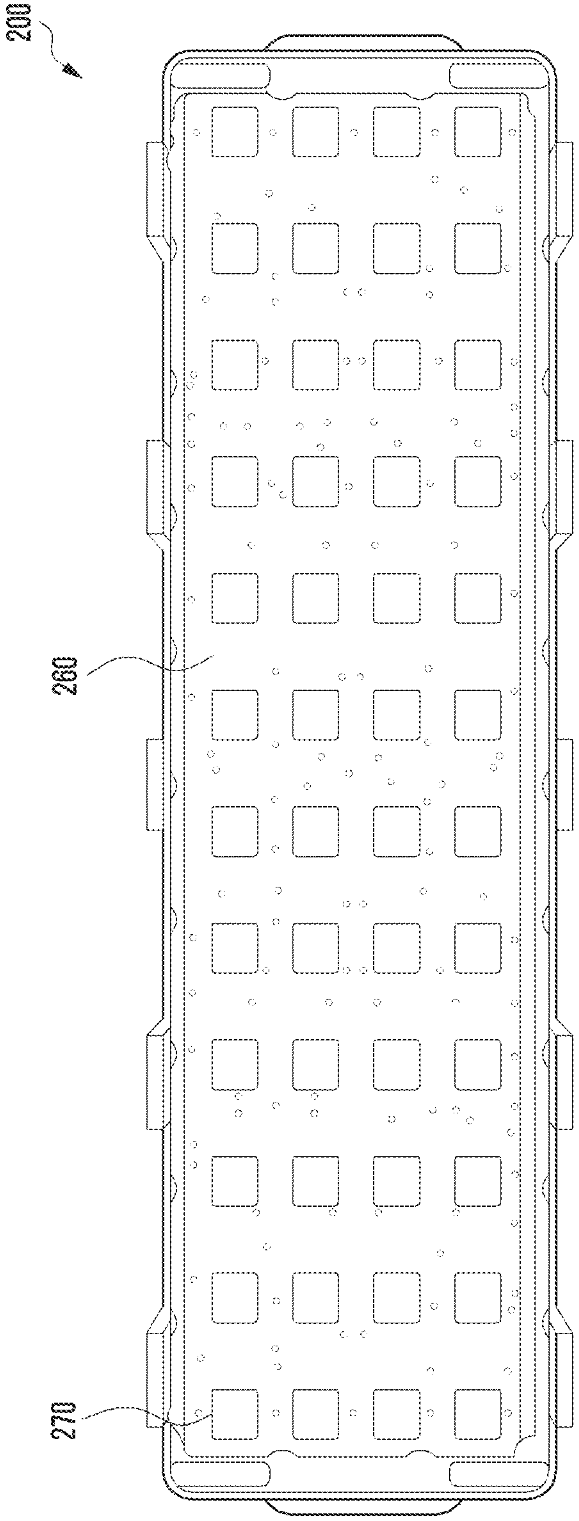
FIG. 2 is a conceptual diagram illustrating an MMU according to an embodiment of the disclosure.

FIG. 2 is a conceptual diagram illustrating one surface of an MMU according to an embodiment of the disclosure.

With reference to FIG. 2, the MMU 200 may include an antenna PCB 260 and an antenna array 270. The antenna array 270 may include a plurality of antennas. The antenna array 270 may be mounted on one surface of the antenna PCB 260.

Figure 3:
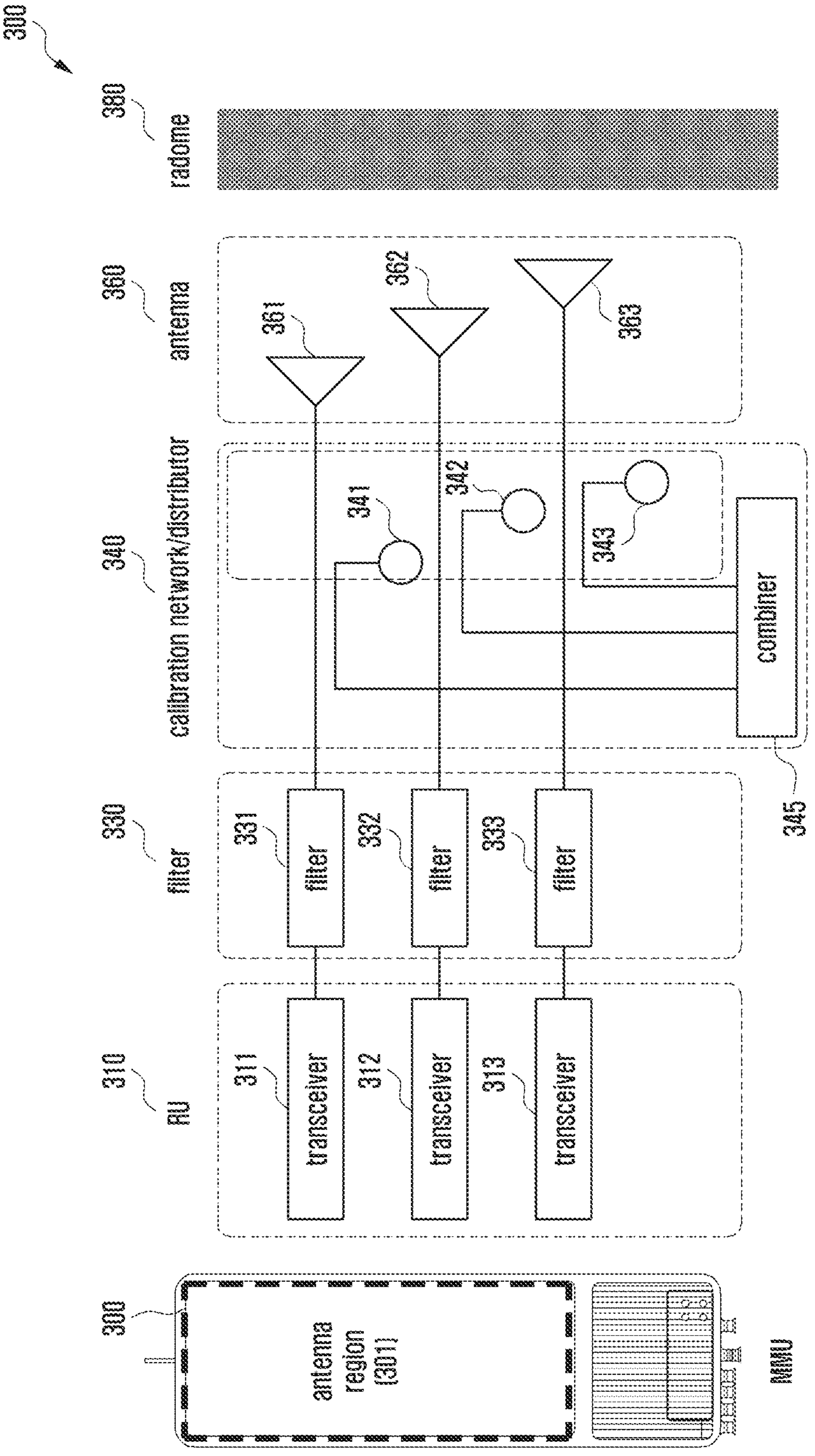
FIG. 3 is a block diagram showing the structure of an MMU according to an embodiment of the disclosure.

Meanwhile, the MMU 200 according to an embodiment of the disclosure may have a structure as shown in FIG. 3.

FIG. 3 is a block diagram showing the structure of an MMU according to an embodiment of the disclosure.

With reference to FIG. 3, the MMU 300 may include an antenna region 301. An RU 310, a filter unit 330, a calibration network/distribution unit 340, an antenna unit 360, and a radome 380 may be arranged in the antenna region 301.

The RU 310 may include a plurality of transceivers 311 to 313. The filter unit 330 may include a plurality of filters 331 to 333. The calibration network/distribution unit 340 may include a plurality of dividers 341 to 343 and a combiner 345.

For example, the first transceiver 311 may be electrically connected to the first filter 331. The second transceiver 311 may be electrically connected to the second filter 332. The third transceiver 313 may be electrically connected to the third filter 333.

The combiner 345 of the calibration network/distributor 340 may be electrically connected to the plurality of dividers 341 to 343.

The first antenna 361 of the antenna unit 360 may be electrically connected to the first filter 331. The second antenna 362 may be electrically connected to the second filter 332. The third antenna 363 may be electrically connected to the third filter 333. The radome 380 may cover the plurality of antennas 361 to 363.

Figure 4:
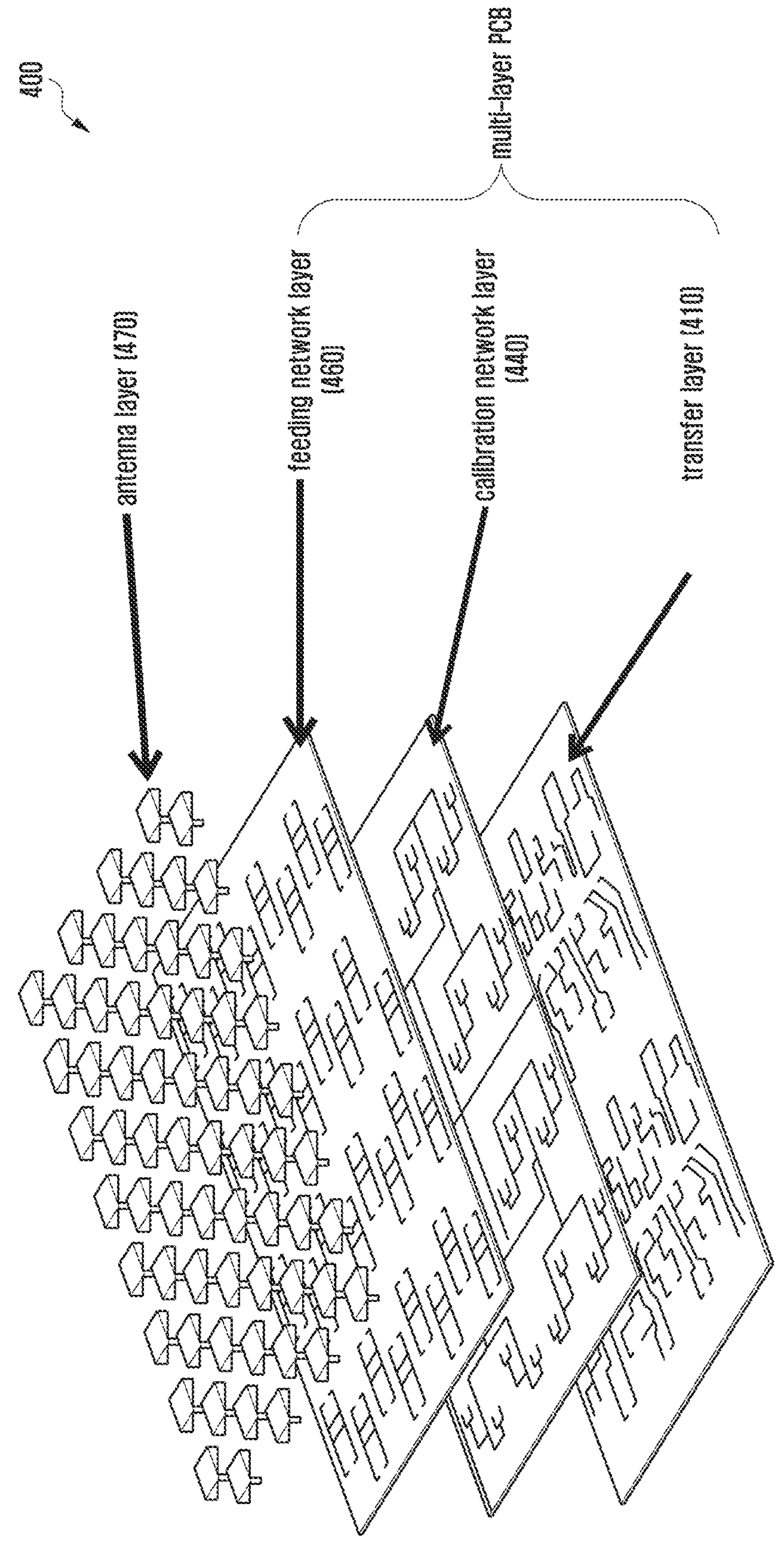
FIG. 4 is a conceptual diagram illustrating the structure of an MMU according to an embodiment of the disclosure.
Figure 5:
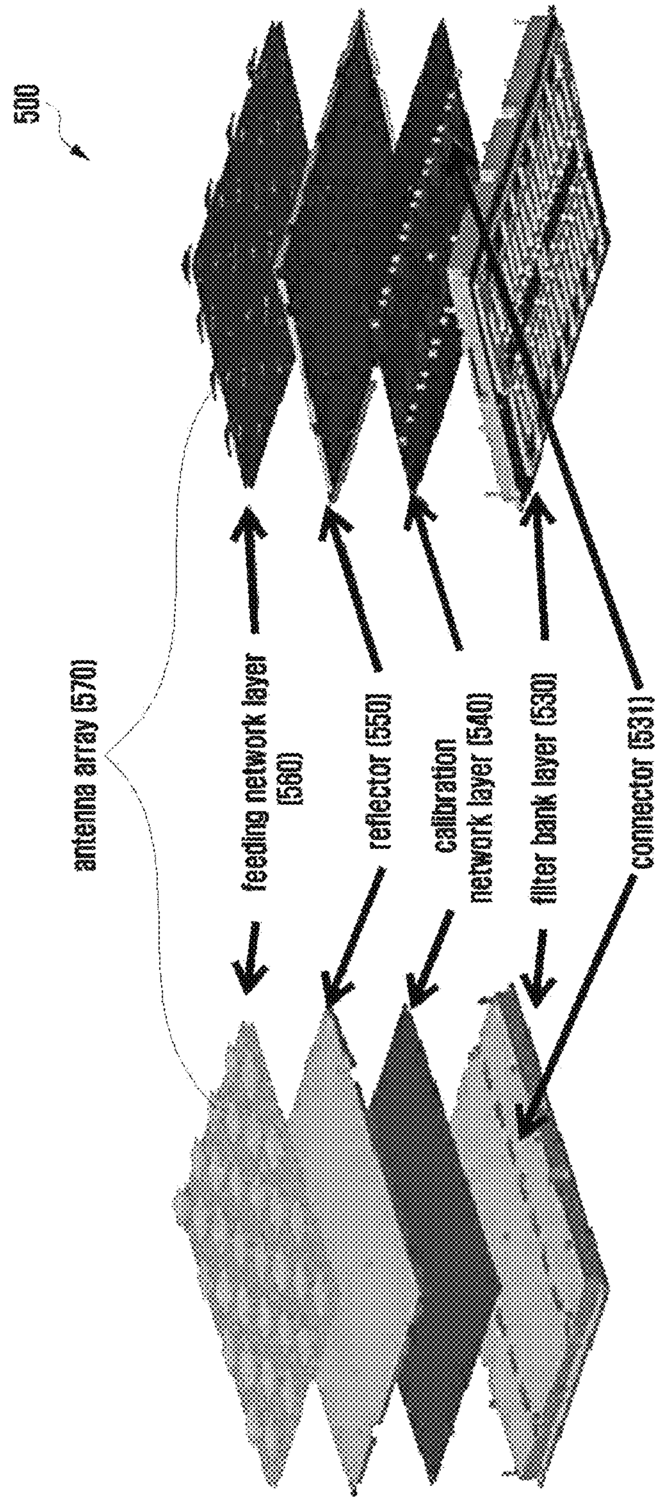
FIG. 5 is a conceptual diagram illustrating the structure of an MMU according to an embodiment of the disclosure.

The MMU 300 according to an embodiment of the disclosure may be composed of a plurality of layers as shown in FIG. 4 or FIG. 5.

FIG. 4 is a conceptual diagram illustrating the structure of an MMU according to an embodiment of the disclosure.

With reference to FIG. 4, the MMU 400 may include a transfer layer 410, a calibration network layer 440, a feeding network layer 460, and an antenna layer 470.

For example, the transfer layer 410 may be the same as or similar to the RU 310 and the filter unit 330 in FIG. 3. The calibration network layer 440 may be the same as or similar to the calibration network/distributor 340 in FIG. 3. The feeding network layer 460 and the antenna layer 470 may be the same as or similar to the antenna unit 360 in FIG. 3. The transfer layer 410, the calibration network layer 440, and the feeding network layer 460 may be referred to as a multi-layer PCB.

The calibration network layer 440 may be disposed on one surface of the transfer layer 410. The feeding network layer 460 may be disposed on one surface of the calibration network layer 440. The antenna layer 470 may be disposed on one surface of the feeding network layer 460.

FIG. 5 is a conceptual diagram illustrating the structure of an MMU according to an embodiment of the disclosure.

With reference to FIG. 5, the MMU 500 may include a filter bank layer 530, a calibration network layer 540, a reflector layer 550, and a feeding network layer 560.

The filter bank layer 530 may be the same as or similar to the transfer layer 410 in FIG. 4. The filter bank layer 530 may include a plurality of connectors 531. The calibration network layer 540 may be the same as or similar to the calibration network layer 440 in FIG. 4.

The calibration network layer 540 may be disposed on one surface of the filter bank layer 530. The reflector layer 550 may be disposed on one surface of the calibration network layer 440. The feeding network layer 560 may be disposed on one surface of the reflector layer 550. An antenna array 570 may be mounted on one surface of the feeding network layer 560.

Figure 6:
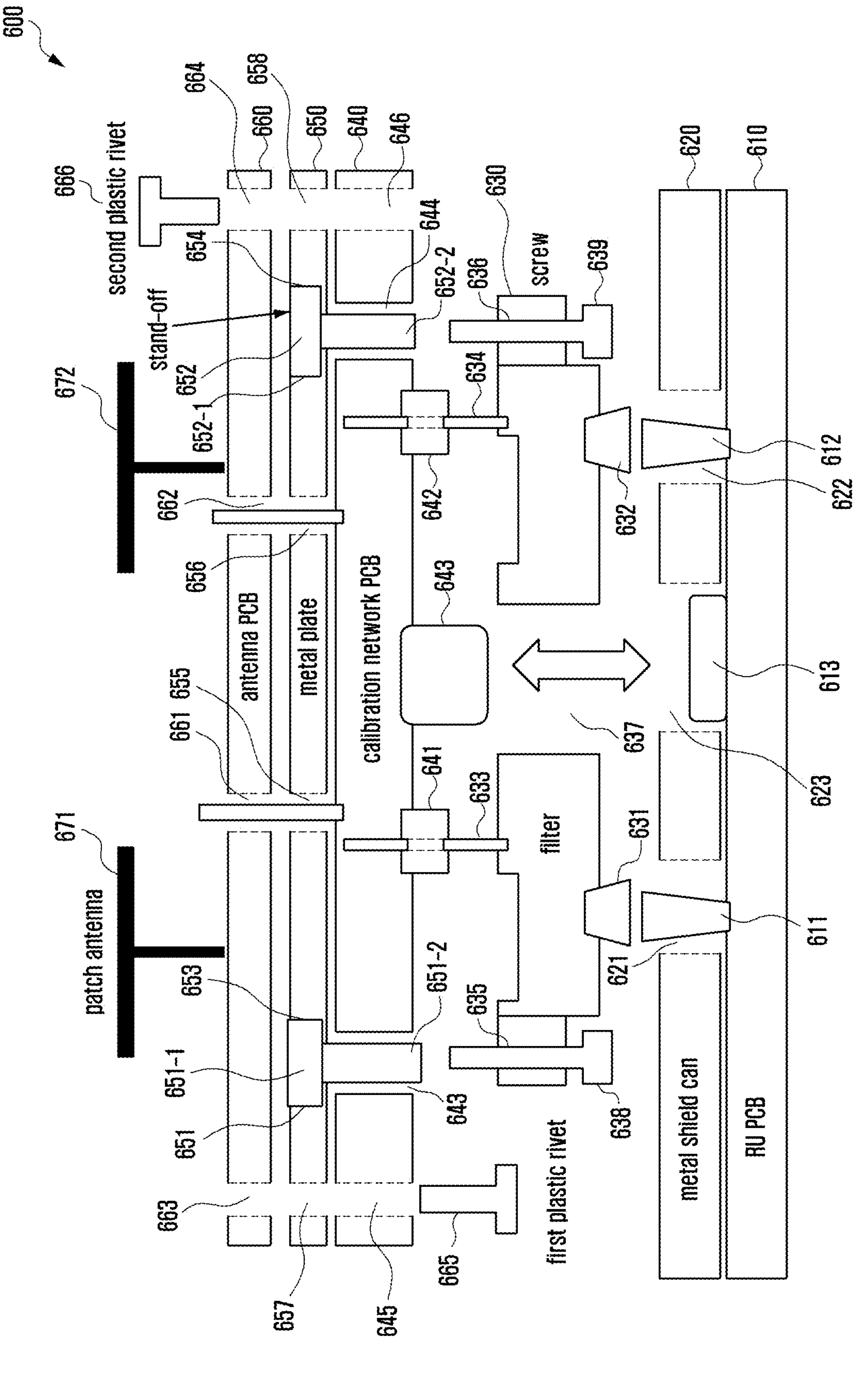
FIG. 6 is a cross-sectional view illustrating an assembly structure of the MMU according to an embodiment of the disclosure.

Meanwhile, a specific assembly structure of the MMU 500 according to an embodiment of the disclosure may be as shown in FIG. 6.

FIG. 6 is a cross-sectional view illustrating an assembly structure of the MMU according to an embodiment of the disclosure.

With reference to FIG. 6, the MMU 600 may include a RU PCB 610, a metal shield can 620, a filter 630, a calibration network PCB 640, a metal plate 650, and an antenna PCB 660.

The RU PCB 610 may include a plurality of connection terminals 611 to 613. For example, the plurality of connection terminals 611 to 613 may be disposed on a specific region of one surface of the RU PCB 610.

The metal shield can 620 may be stacked on one surface of the RU PCB 610. One surface of the RU PCB 610 and the other surface of the metal shield can 620 may face each other. The metal shield can 620 may include a plurality of holes 621 to 623 penetrating one surface and the other surface of a specific region of the metal shield can 620.

The filter 630 may be stacked on a region of one surface of the metal shield can 620. The region of one surface of the metal shield can 620 and the other surface of the filter 630 may face each other.

The filter 630 may include a plurality of connection terminals 631 to 634. For example, the first connection terminal 631 and the second connection terminal 632 may be disposed on a region of the other surface of the filter 630. The third connection terminal 633 and the fourth connection terminal 634 may be disposed on a region of one surface of the filter 630. The filter 630 may include a plurality of holes 635 to 637 penetrating a region of one surface of the filter 630 and a region of the other surface of the filter 630.

The first connection terminal 631 of the filter 630 and the first connection terminal 611 of the RU PCB 610 may be in contact with each other. The first connection terminal 631 of the filter 630 and the first connection terminal 611 of the RU PCB 610 may be electrically connected. For example, the first connection terminal 631 of the filter 630 and the first connection terminal 611 of the RU PCB 610 may be in contact with each other through the first hole 621 of the metal shield can 620.

The second connection terminal 632 of the filter 630 and the second connection terminal 612 of the RU PCB 610 may be in contact with each other. The second connection terminal 632 of the filter 630 and the second connection terminal 612 of the RU PCB 610 may be electrically connected. For example, the second connection terminal 632 of the filter 630 and the second connection terminal 612 of the RU PCB 610 may be in contact with each other through the second hole 622 of the metal shield can 620.

The calibration network PCB 640 may be stacked on one surface of the filter 630. A region of the other surface of the calibration network PCB 640 and a region of one surface of the filter 630 may face each other.

The calibration network PCB 640 may include a plurality of connection terminals 641 to 643. For example, the plurality of connection terminals 641 to 643 may be disposed on a region of the other surface of the calibration network PCB 640.

The first connection terminal 641 of the calibration network PCB 640 may be in contact with the third connection terminal 633 of the filter 630. The third connection terminal 633 of the filter 630 may be inserted into a groove of the first connection terminal 641 of the calibration network PCB 640. The first connection terminal 641 of the calibration network PCB 640 and the third connection terminal 633 of the filter 630 may be electrically connected.

The second connection terminal 642 of the calibration network PCB 640 may be in contact with the fourth connection terminal 634 of the filter 630. The fourth connection terminal 634 of the filter 630 may be inserted into a groove of the second connection terminal 642 of the calibration network PCB 640. The second connection terminal 642 of the calibration network PCB 640 and the fourth connection terminal 634 of the filter 630 may be electrically connected.

The third connection terminal 643 of the calibration network PCB 640 may be in contact with the third connection terminal 613 of the RU PCB 610. For example, the third connection terminal 643 of the calibration network PCB 640 may be in contact with the third connection terminal 613 of the RU PCB 610 through the third hole 637 of the filter 630 and the third hole 623 of the metal shield can 620. The third connection terminal 643 of the calibration network PCB 640 and the third connection terminal 613 of the RU PCB 610 may be electrically connected.

The calibration network PCB 640 may include a plurality of holes 643 to 646.

The metal plate 650 may include a plurality of stand-offs 651 and 652. The first stand-off 651 may include a head 651-1 and a body 651-2. The head 651-1 of the first stand-off 651 may be inserted into a first region 653 of the metal plate 650. The body 651-2 of the first stand-off 651 may protrude in a direction of the first hole 635 of the filter 630 along the first hole 643 of the calibration network PCB 640.

The second stand-off 652 may include a head 652-1 and a body 652-2. The head 652-1 of the second stand-off 652 may be inserted into a second region 654 of the metal plate 650. The body 652-2 of the first stand-off 651 may protrude in a direction of the second hole 636 of the filter 630 along the second hole 644 of the calibration network PCB 640.

Due to the structure in which the head 651-1 of the first stand-off 651 and the head 652-1 of the second stand-off 652 are inserted into the metal plate 650, the overall thickness of the MMU 600 can be reduced.

The first screw 638 of the filter 630 may pass through the first hole 635 of the filter 630 to be physically coupled to the first stand-off 651 of the metal plate 650. As the first screw 638 and the first stand-off 651 are physically coupled, the filter 630, the calibration network PCB 640, and the metal plate 650 may be physically coupled. The filter 630, the calibration network PCB 640, and the metal plate 650 can be physically coupled through the first screw 638 and the first stand-off 651.

The second screw 639 of the filter 630 may pass through the second hole 636 of the filter 630 to be physically coupled to the second stand-off 652 of the metal plate 650. As the second screw 639 and the second stand-off 652 are physically coupled, the filter 630, the calibration network PCB 640, and the metal plate 650 can be physically coupled. The filter 630, the calibration network PCB 640, and the metal plate 650 can be physically coupled and fixed through the second screw 639 and the second stand-off 652.

The antenna PCB 660 may be stacked on one surface of the metal plate 650. The other surface of the antenna PCB 660 and one surface of the metal plate 650 may face each other. For example, an adhesive member may be disposed between the other surface of the antenna PCB 660 and one surface of the metal plate 650. The other surface of the antenna PCB 660 and one surface of the metal plate 650 may be bonded through the adhesive member.

The antenna PCB 660 may include a plurality of holes 661 to 664. The first hole 661 of the antenna PCB 660 may correspond to the first hole 655 of the metal plate 650. The second hole 662 of the antenna PCB 660 may correspond to the second hole 656 of the metal plate 650. The third hole 663 of the antenna PCB 660 may correspond to the third hole 657 of the metal plate 650. The fourth hole 664 of the antenna PCB 660 may correspond to the fourth hole 658 of the metal plate 650.

The antenna PCB 660 may include a plurality of rivets 665 and 666. For example, the first rivet 665 may penetrate through the third hole 663 of the antenna PCB 660, the third hole 567 of the metal plate 650, and the third hole 645 of the calibration network PCB 640, so that the antenna PCB 660, the metal plate 650, and the calibration network PCB 640 can be physically coupled. The antenna PCB 660, the metal plate 650, and the calibration network PCB 640 may be physically coupled and fixed through the first rivet 665.

The second rivet 666 may penetrate through the fourth hole 664 of the antenna PCB 660, the fourth hole 658 of the metal plate 650, and the fourth hole 646 of the calibration network PCB 640, so that the antenna PCB 660, the metal plate 650, and the calibration network PCB 640 can be physically coupled. The antenna PCB 660, the metal plate 650, and the calibration network PCB 640 may be physically coupled and fixed through the second rivet 656.

The antenna PCB 660 may include a plurality of antennas 671 and 672. For example, the plurality of antennas 671 and 672 may be arranged on a region of one surface of the antenna PCB 660.

Figure 7:
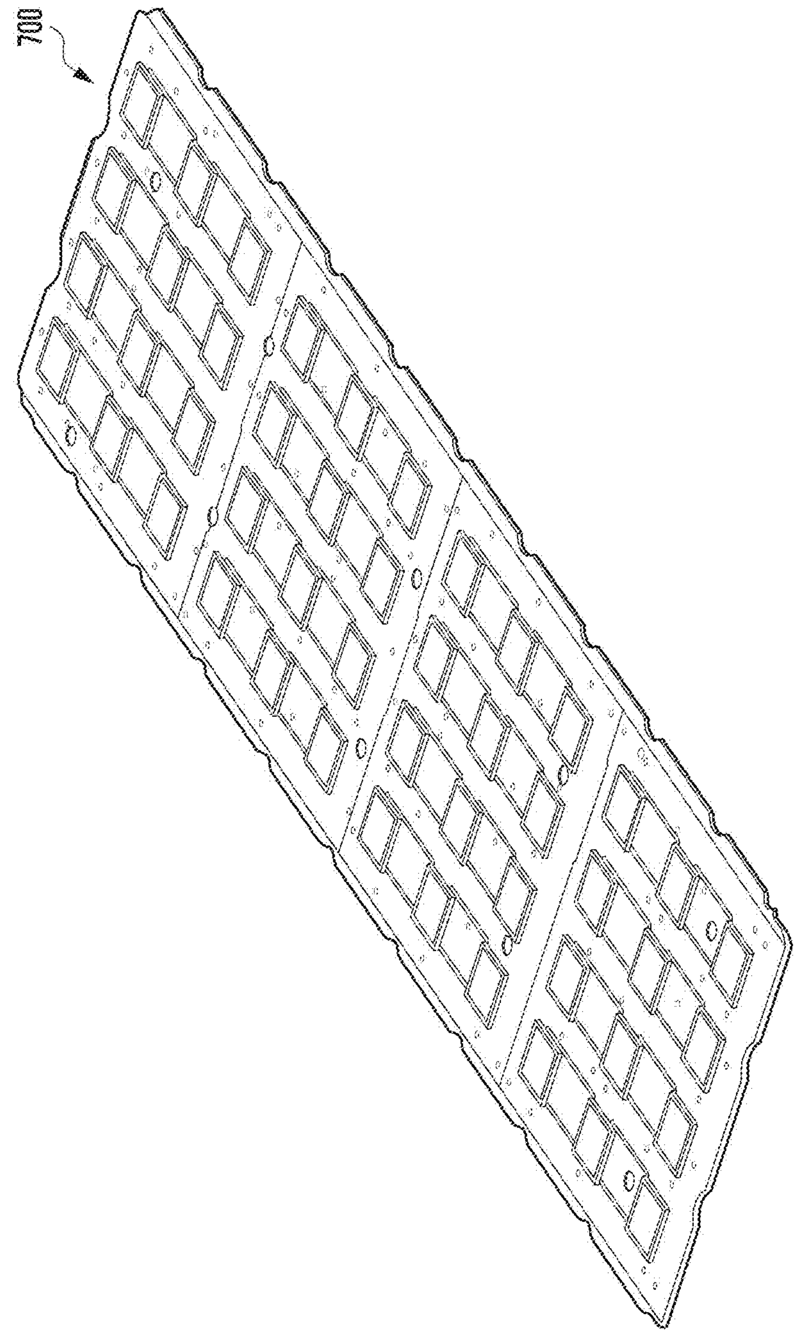
FIG. 7 is a perspective view illustrating an assembly structure of the MMU according to an embodiment of the disclosure.
Figure 8:
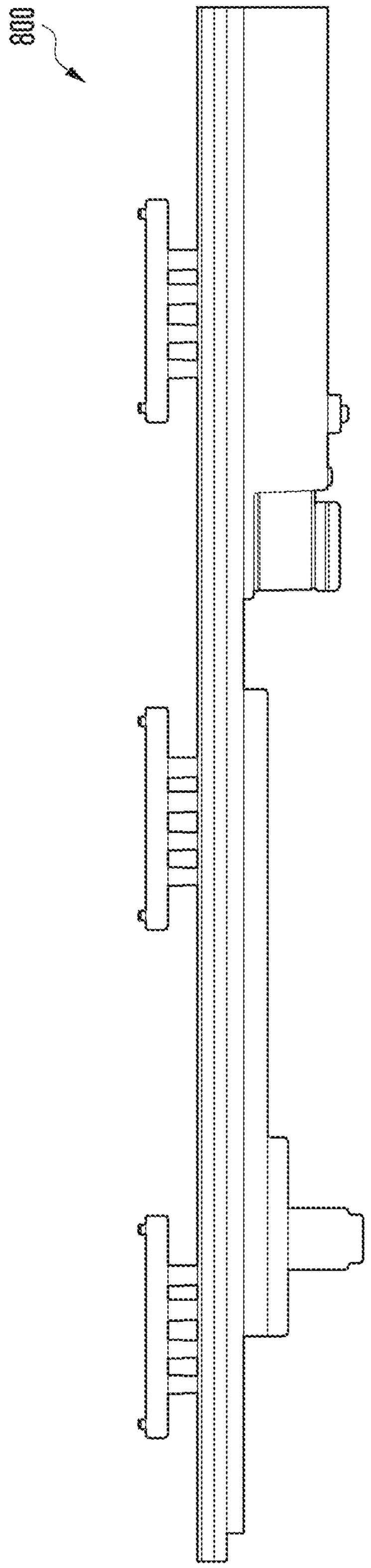
FIG. 8 is a conceptual diagram illustrating an assembly structure of the MMU according to an embodiment of the disclosure.

For example, the MMU 600 according to an embodiment of the disclosure may be the same as or similar to the MMU 700 of FIG. 7. In addition, the side of the MMU 600 according to an embodiment of the disclosure may be the same as or similar to the side of the MMU 800 of FIG. 8.

Figure 9:
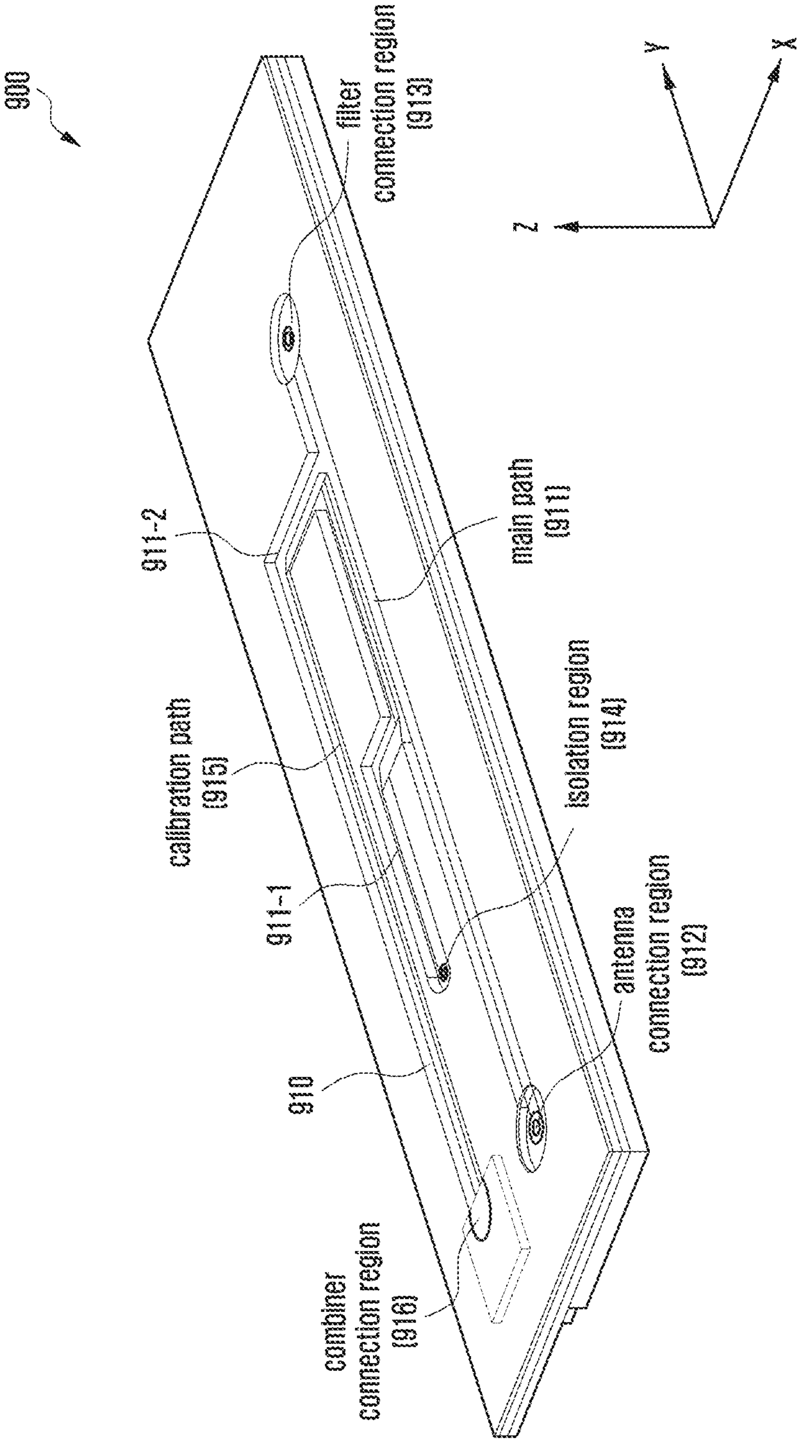
FIG. 9 is a perspective view illustrating a metal plate of the MMU including a transmission line according to an embodiment of the disclosure.

FIG. 9 is a perspective view illustrating a metal plate of the MMU including a transmission line according to an embodiment of the disclosure.

With reference to FIG. 9, the metal plate 900 may include a transmission line 910. The transmission line 910 may be referred to as a microstrip line. The transmission line 910 may be made of a conductive metal material.

The transmission line 910 may include a main path 911, an antenna connection region 912, a filter region 913, an isolation region 914, a calibration path 915, and a combiner connection region 916.

One end of the main path 911 may be connected to the antenna connection region 912. The other end of the main path 911 may be connected to the filter region 913. The main path 911 may include a first branch 911-1 and a second branch 911-2.

For example, one end of the first branch 911-1 may be connected to the main path 911. The other end of the first branch 911-1 may be connected to the isolation region 914. One end of the second branch 911-2 may be connected to the main path 911. The other end of the second branch 911-2 may be connected to the calibration path 915.

For example, the other end of the calibration path 915 may be connected to the other end of the second branch 911-2. One end of the calibration path 915 may be connected to the combiner connection region 916.

Due to the structure of the metal plate 900 including the transmission line 910, the overall thickness of the MMU 900 may be reduced. The stacked structure of the metal plate 900 will be described with reference to FIGS. 10 to 13.

Figure 10:
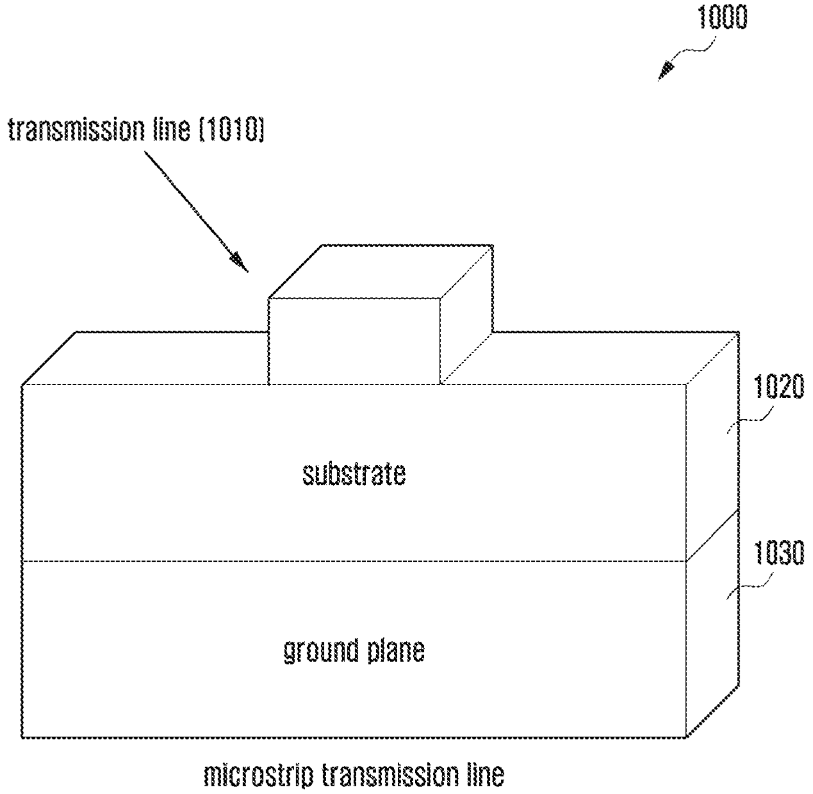
FIG. 10 is a cross-sectional view illustrating a metal plate of the MMU including a transmission line according to an embodiment of the disclosure.

FIG. 10 is a cross-sectional view illustrating a metal plate of the MMU including a transmission line according to an embodiment of the disclosure.

With reference to FIG. 10, the metal plate 1000 may include a transmission line 1010, a substrate 1020, and a ground plane 1030. The metal plate 1000 may be the same as or similar to the metal plate 900 in FIG. 9. The transmission line 1010 may be the same as or similar to the transmission line 910 in FIG. 9.

For example, the substrate 1020 may be disposed on one surface of the ground plane 1030. The other surface of the substrate 1020 and one surface of the ground plane 1030 may face each other. The transmission line 1010 may be disposed on some of one surface of the substrate 1020. The other surface of the transmission line 1010 may face a portion of one surface of the substrate 1020. The transmission line 1010 having the above-described structure may be referred to as a microstrip transmission line. For example, the transmission line 1010 and the substrate 1020 may be disposed as shown in FIG. 11.

Figure 11:
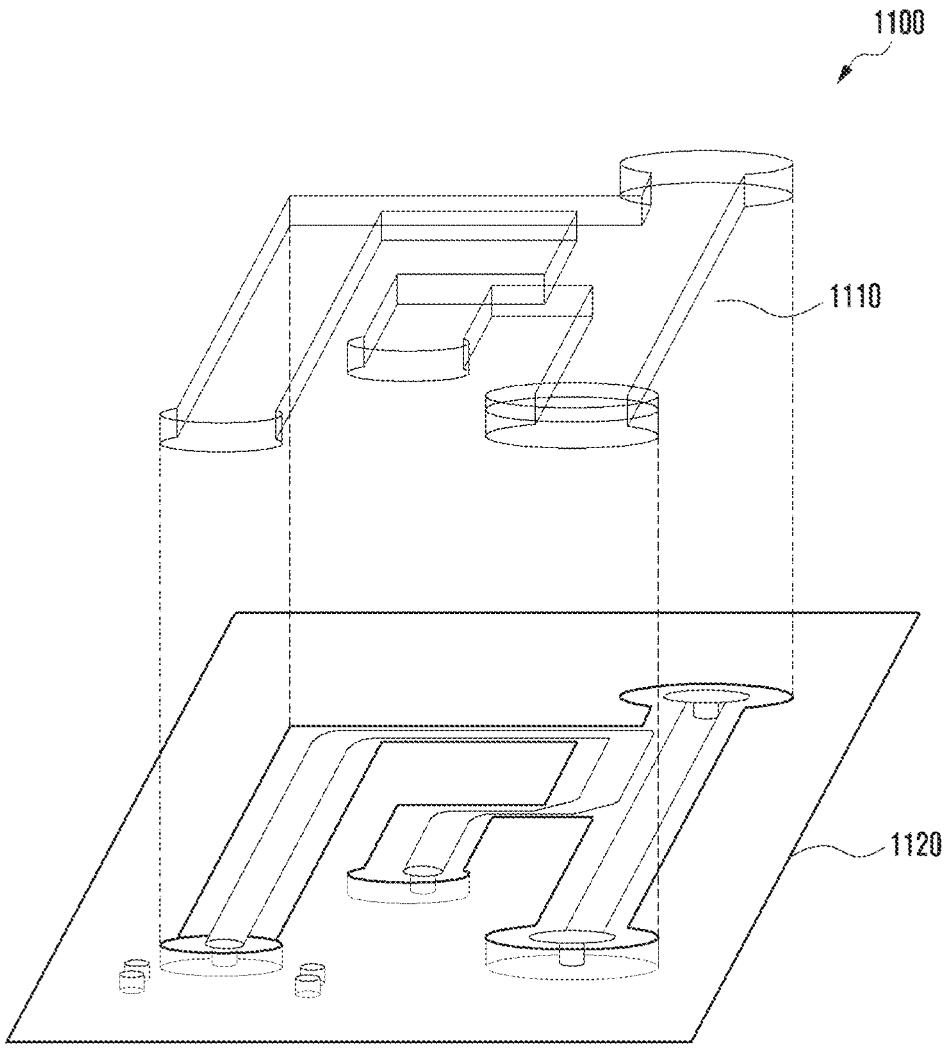
FIG. 11 is a cross-sectional view illustrating a metal plate of the MMU including a transmission line according to an embodiment of the disclosure.

FIG. 11 is a conceptual diagram illustrating a metal plate of the MMU including a transmission line according to an embodiment of the disclosure.

With reference to FIG. 11, the transmission line 1110 may be formed on one surface of the substrate 1120. For example, the transmission line 1110 may be formed on one surface of the substrate 1120 through a step processing method.

Figure 12:
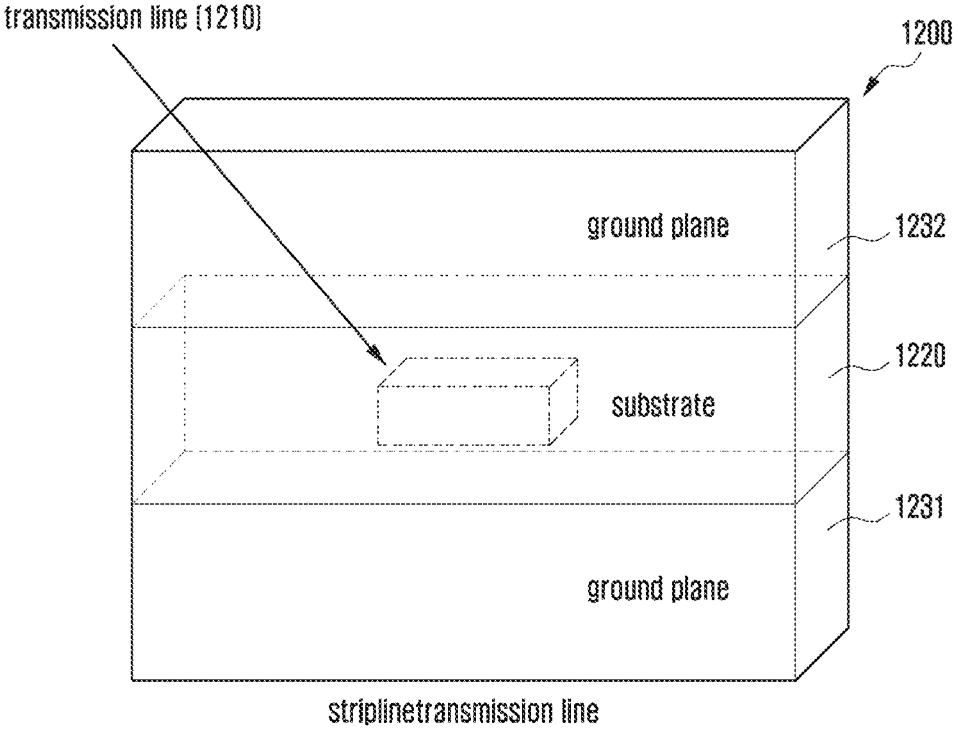
FIG. 12 is a conceptual diagram illustrating a metal plate of the MMU including a transmission line according to an embodiment of the disclosure.

FIG. 12 is a cross-sectional view illustrating a metal plate of the MMU including a transmission line according to an embodiment of the disclosure.

With reference to FIG. 12, the metal plate 1200 may include a transmission line 1210, a substrate 1220, a first ground plane 1231, and a second ground plane 1232. The metal plate 1200 may be the same as or similar to the metal plate 900 in FIG. 9. The transmission line 1210 may be the same as or similar to the transmission line 910 in FIG. 9.

For example, the substrate 1220 may be disposed on one surface of the first ground plane 1231. The other surface of the substrate 1220 and one surface of the ground plane 1230 may face each other. The transmission line 1210 may be inserted into the substrate 1220. For example, the transmission line 1210 may be surrounded by the substrate 1220. The second ground plane 1232 may be disposed on one surface of the substrate 1220. The other surface of the second ground plane 1232 and one surface of the substrate 1220 may face each other.

The transmission line 1210 having the above-described structure may be referred to as a strip transmission line.

Figure 13:
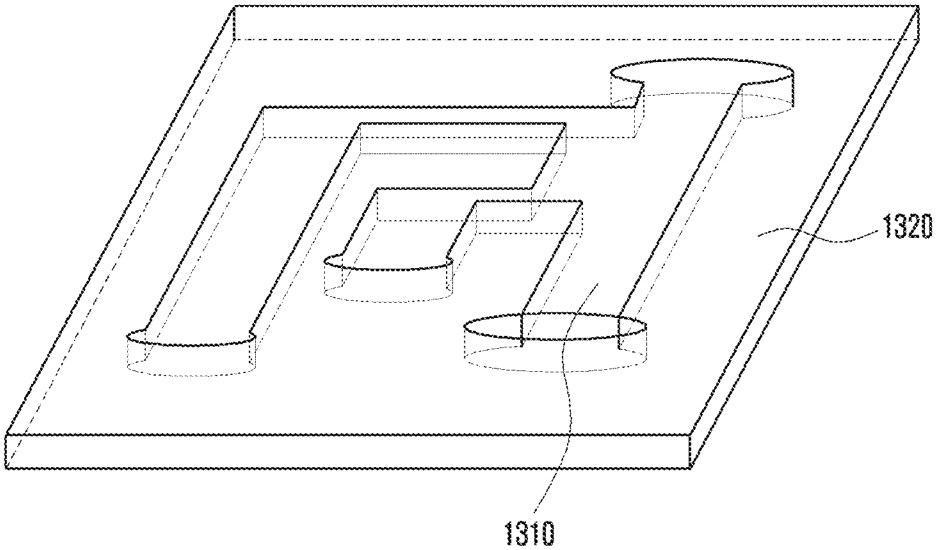
FIG. 13 is a conceptual diagram illustrating a metal plate of the MMU including a transmission line according to an embodiment of the disclosure.

For example, the transmission line 1210 and the substrate 1220 may be arranged as shown in FIG. 13.

FIG. 13 is a conceptual diagram illustrating a metal plate of the MMU including a transmission line according to an embodiment of the disclosure.

With reference to FIG. 13, the transmission line 1310 may be formed inside the substrate 1320. For example, the transmission line 1310 may be inserted into the substrate 1320. For example, the transmission line 1310 may be formed inside the substrate 1320 through a joining processing method.

Figure 14:
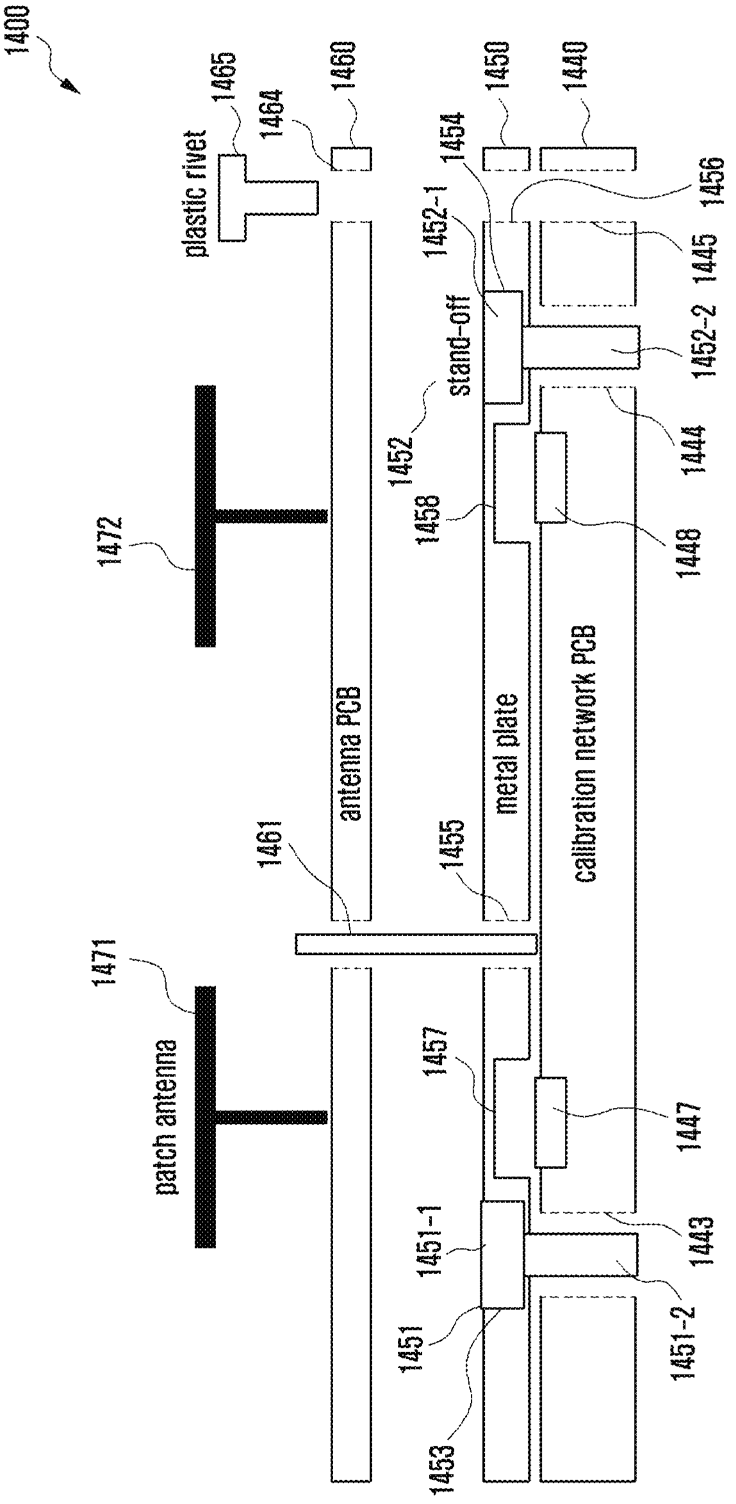
FIG. 14 is a cross-sectional view showing a metal plate of the MMU including a hole according to an embodiment of the disclosure.

FIG. 14 is a cross-sectional view showing a metal plate of the MMU including a hole according to an embodiment of the disclosure.

With reference to FIG. 14, the MMU 1400 according to an embodiment of the disclosure may include a calibration network PCB 1440, a metal plate 1450, and an antenna PCB 1460.

The calibration network PCB 1440 may include a first hole 1443 and a second hole 1444. The calibration network PCB 1440 may include a first circuit 1447 and a second circuit 1448.

The metal plate 1450 may include a first stand-off 1451 and a second stand-off 1452. The first stand-off 1451 may include a head 1451-1 and a body 1451-2. The head 1451-1 of the first stand-off 1451 may be inserted into a first region 1453 of the metal plate 1450. The body 1451-2 of the first stand-off 1451 may protrude along the first hole 1443 of the calibration network PCB 1440.

The second stand-off 1452 may include a head 1452-1 and a body 1452-2. The head 1452-1 of the second stand-off 1452 may be inserted into a second region 1454 of the metal plate 1450. The body 1452-2 of the first stand-off 1451 may protrude along the second hole 1444 of the calibration network PCB 1440.

The metal plate 1450 may include a first hole 1455 and a second hole 1456. For example, the diameter of the first hole 1455 may be 4.5 mm to 5.5 mm. The impedance value may vary according to the size of the diameter of the first hole 1455. The first hole 1455 may be fabricated in a coaxial structure. Also, the first hole 1455 may be fabricated in a waveguide coupling configuration. For example, the first hole 1455 may be fabricated in a non-contact coupling structure.

The metal plate 1450 may further include a first groove 1457 and a second groove 1458. For example, the first groove 1457 may cover the first circuit 1447 of the calibration network PCB 1440. The first groove 1457 may cover the second circuit 1448 of the calibration network PCB 1440.

The antenna PCB 1460 may be stacked on one surface of the metal plate 1450. The other surface of the antenna PCB 1460 and one surface of the metal plate 1450 may face each other.

The antenna PCB 1460 may include a first hole 1461. The first hole 1461 of the antenna PCB 1460 may correspond to the first hole 1455 of the metal plate 1450.

The antenna PCB 1460 may include a rivet 1465. For example, the rivet 1465 may penetrate through the first hole 1461 of the antenna PCB 1460, the second hole 1464 of the metal plate 1450, and the third hole 1445 of the calibration network PCB 1440, so that the antenna PCB 1460, the metal plate 1450, and the calibration network PCB 1440 can be physically coupled. The antenna PCB 1460, the metal plate 1450, and the calibration network PCB 1440 may be physically coupled and fixed through the rivet 1465.

The antenna PCB 1460 may include a first antenna 1471 and a second antenna 1472. For example, the first antenna 1471 and the second antenna 1472 may be disposed on a region of one surface of the antenna PCB 1460.

Although the metal plate 1450 is illustrated as including two holes 1455 and 1456 in FIG. 14 for convenience of description, the metal plate 1450 may include three or more holes. For example, the holes of the metal plate 1450 may be formed as shown in FIG. 15.

Figure 15:
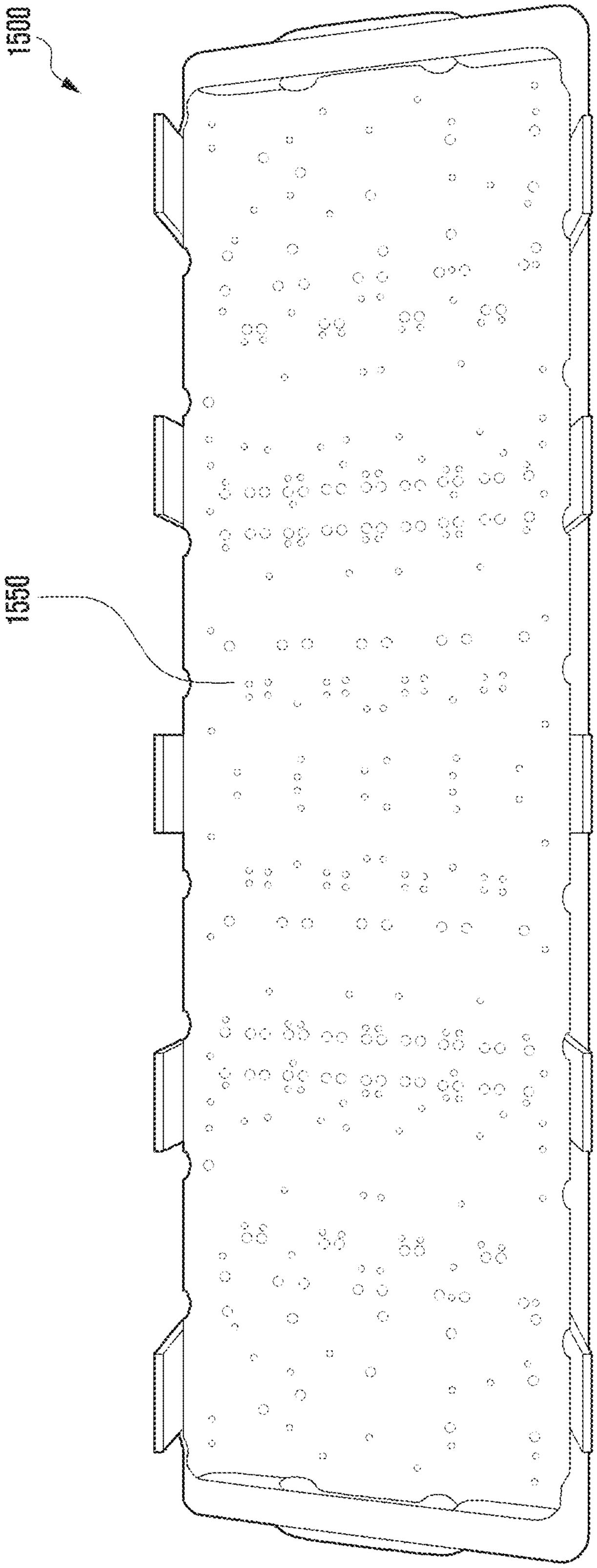
FIG. 15 is a conceptual diagram illustrating a metal plate of the MMU including a hole according to an embodiment of the disclosure.

FIG. 15 is a conceptual diagram illustrating a metal plate of the MMU including a hole according to an embodiment of the disclosure.

With reference to FIG. 15, a plurality of holes and a plurality of grooves may be formed on one surface of the metal plate 1550 of the MMU 1500 according to an embodiment of the disclosure. For example, when a portion of one surface of the metal plate 1550 is enlarged, it may be as shown in FIG. 16.

Figure 16:
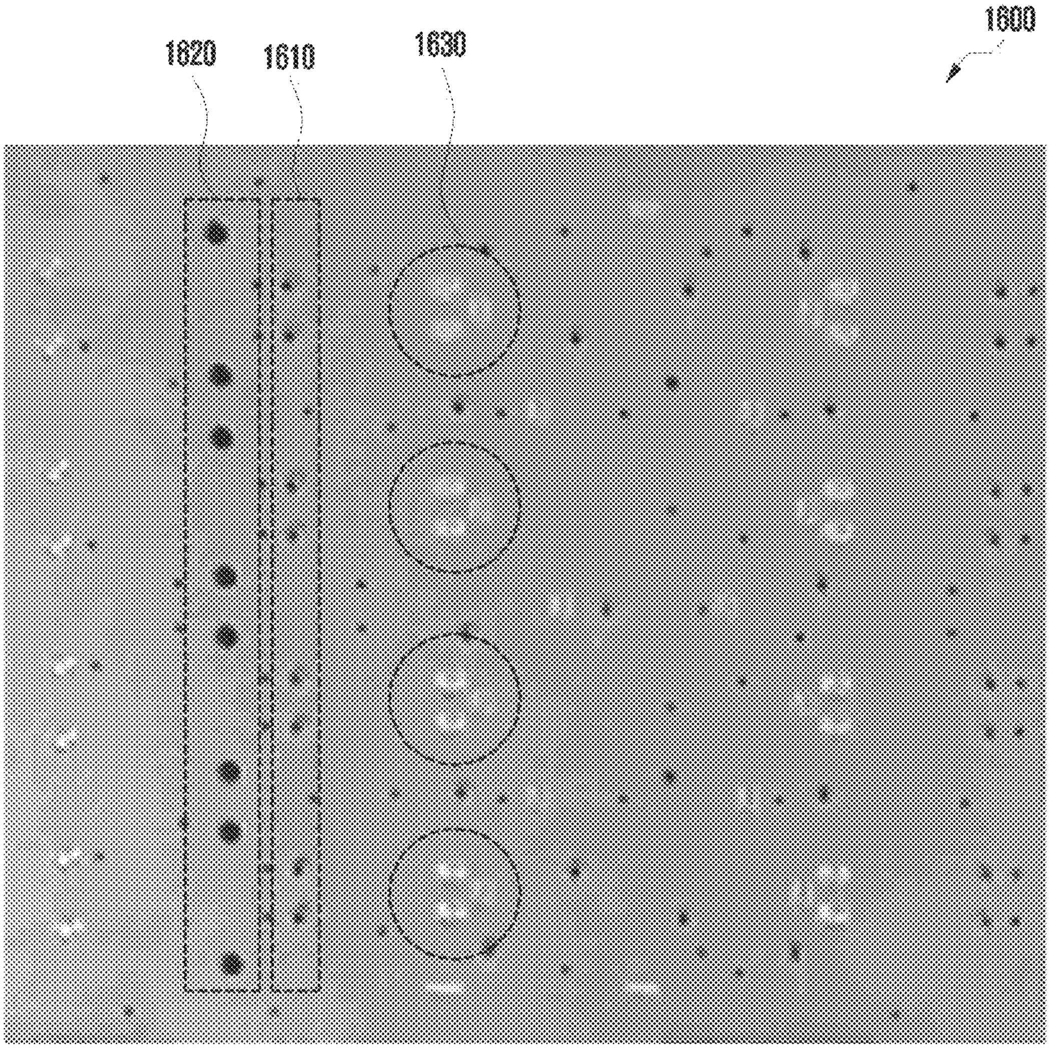
FIG. 16 is a conceptual diagram illustrating a metal plate of the MMU including a hole according to an embodiment of the disclosure.

With reference to FIG. 16, the metal plate 1600 may include a first region 1610, a second region 1620, and a third region 1630. The first region 1610 may include a plurality of holes. For example, the plurality of holes in the first region 1610 may correspond to the first hole 655 and the second hole 656 of the metal plate 650 in FIG. 6 and the first hole 1455 of the metal plate 1450 in FIG. 14.

The second region 1620 may include a plurality of holes. For example, the plurality of holes in the second region 1620 may correspond to the third hole 657 and the fourth hole 658 of the metal plate 650 in FIG. 6 and the second hole 1456 of the metal plate 1450 in FIG. 14.

The third region 1630 may include a plurality of grooves. The plurality of grooves in the third region 1630 may correspond to the first groove 1457 and the second groove 1458 of the metal plate 1450 in FIG. 14.

Figure 17:
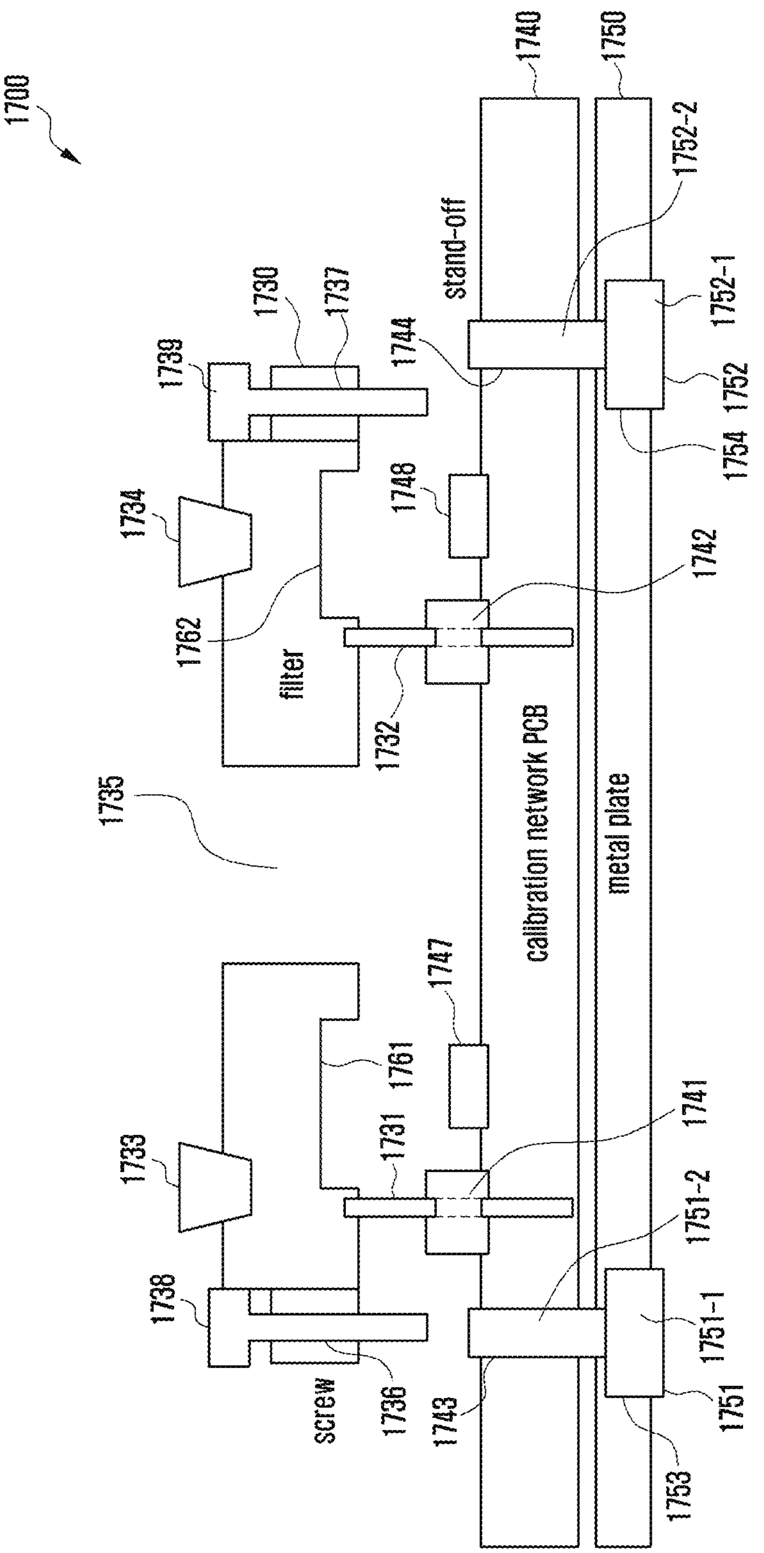
FIG. 17 is a cross-sectional view showing an assembly structure of the MMU according to an embodiment of the disclosure.

FIG. 17 is a cross-sectional view showing an assembly structure of the MMU according to an embodiment of the disclosure.

With reference to FIG. 17, the MMU 1700 may include a filter 1730, a calibration network PCB 1740, and a metal plate 1750.

The filter 1730 may include a plurality of connection terminals 1731 to 1734. For example, the first connection terminal 1731 and the second connection terminal 1732 may be disposed on a region of one surface of the filter 1730. The third connection terminal 1733 and the fourth connection terminal 1734 may be disposed on a region of the other surface of the filter 1730. The filter 1730 may include a plurality of holes 1735 to 1737 penetrating a region of one surface of the filter 1730 and a region of the other surface.

The filter 1730 may be disposed on one surface of the calibration network PCB 1740. The other surface of the filter 1730 may face a region of one surface of the calibration network PCB 1740.

The calibration network PCB 1740 may include a first connection terminal 1741 and a second connection terminal 1742. For example, the first connection terminal 1741 and the second connection terminal 1742 may be disposed in different regions of the other surface of the calibration network PCB 1740.

The first connection terminal 1741 of the calibration network PCB 1740 may be in contact with the first connection terminal 1731 of the filter 1730. The first connection terminal 1731 of the filter 1730 may be inserted into a groove of the first connection terminal 1741 of the calibration network PCB 1740. The first connection terminal 1741 of the calibration network PCB 1740 and the first connection terminal 1731 of the filter 1730 may be electrically connected.

The second connection terminal 1742 of the calibration network PCB 1740 may be in contact with the second connection terminal 1732 of the filter 1730. The second connection terminal 1732 of the filter 1730 may be inserted into a groove of the second connection terminal 1742 of the calibration network PCB 1740. The second connection terminal 1742 of the calibration network PCB 1740 and the second connection terminal 1732 of the filter 1730 may be electrically connected.

The filter 1730 may include a first groove 1761 and a second groove 1762. The first groove 1761 of the filter 1730 may cover a first circuit 1747 of the calibration network PCB 1740. The first groove 1761 of the filter 1730 may have a shielding function. For example, the first groove 1761 of the filter 1730 may shield a leakage current generated from the first circuit 1747 of the calibration network PCB 1740.

The second groove 1762 of the filter 1730 may cover a second circuit 1748 of the calibration network PCB 1740. The second groove 1762 of the filter 1730 may have a shielding function. For example, the second groove 1762 of the filter 1730 may shield a leakage current generated from the second circuit 1748 of the calibration network PCB 1740.

The calibration network PCB 1740 may include a first hole 1743 and a second hole 1744. The filter 1730 may include a first hole 1735, a second hole 1736, and a third hole 1737.

The metal plate 1750 may include a first stand-off 1751 and a second stand-off 1752. The first stand-off 1751 may include a head 1751-1 and a body 1751-2. The head 1751-1 of the first stand-off 1751 may be inserted into a first region 1753 of the metal plate 1750. The body 1751-2 of the first stand-off 1751 may protrude in a direction of the second hole 1736 of the filter 1730 along the first hole 1743 of the calibration network PCB 1740.

The second stand-off 1752 may include a head 1752-1 and a body 1752-2. The head 1752-1 of the second stand-off 1752 may be inserted into a second region 1754 of the metal plate 1750. The body 1752-2 of the first stand-off 1751 may protrude in a direction of the third hole 1737 of the filter 1730 along the second hole 1744 of the calibration network PCB 1740.

The first screw 1738 of the filter 1730 may pass through the second hole 1736 of the filter 1730 to be physically coupled to the first stand-off 1751 of the metal plate 1750. The first screw 1738 and the first stand-off 1751 may be physically coupled, so that the filter 1730, the calibration network PCB 1740, and the metal plate 1750 can be physically coupled. The filter 1730, the calibration network PCB 1740, and the metal plate 1750 may be physically coupled through the first screw 1738 and the first stand-off 1751.

Figure 18:
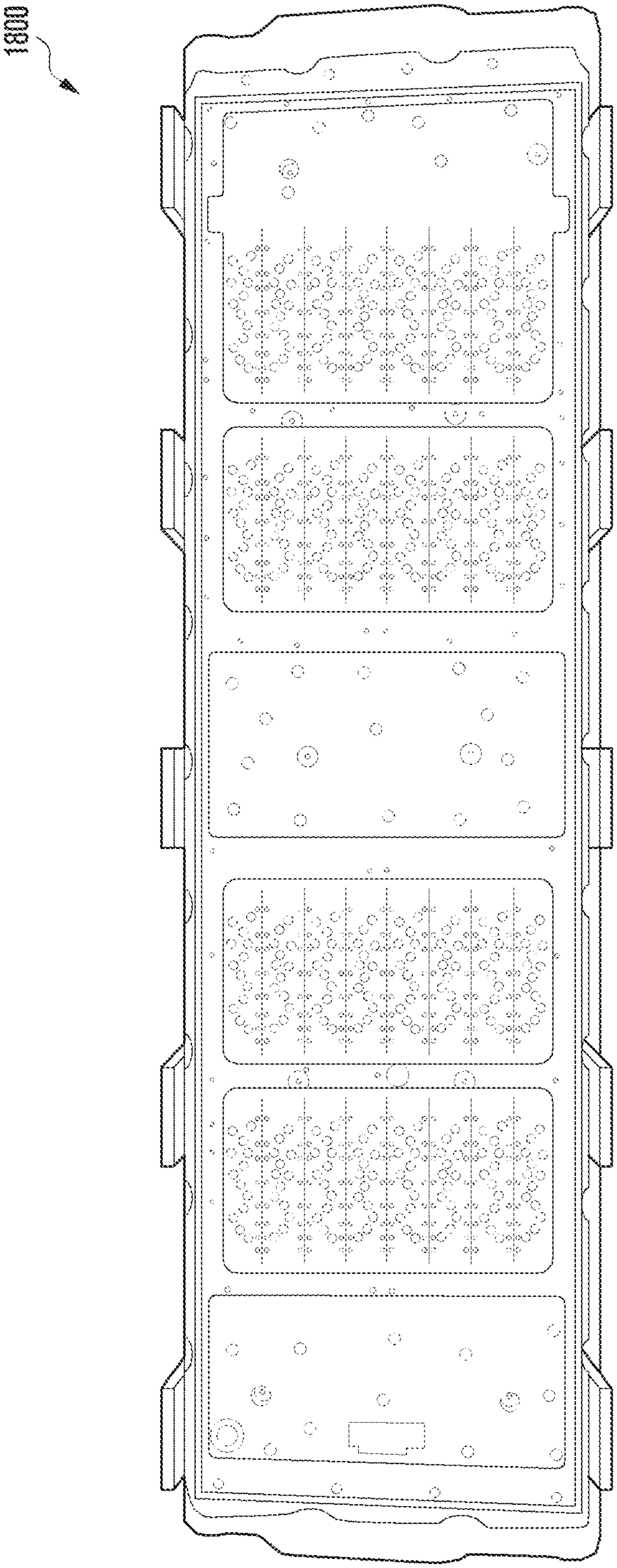
FIG. 18 is a conceptual diagram showing an assembly structure of the MMU according to an embodiment of the disclosure.

The second screw 1739 of the filter 1730 may pass through the third hole 1737 of the filter 1730 to be physically coupled to the second stand-off 1752 of the metal plate 1750. The second screw 1739 and the second stand-off 1752 may be physically coupled, so that the filter 1730, the calibration network PCB 1740, and the metal plate 1750 can be physically coupled. The filter 1730, the calibration network PCB 1740, and the metal plate 1750 may be physically coupled and fixed through the second screw 1739 and the second stand-off 1752. For example, the other surface of the metal plate 1750 physically coupled and fixed to the calibration network PCB 1740 through the second screw 1739 and the second stand-off 1752 may be as shown in FIG. 18. FIG. 18 shows the other surface of the metal plate 1800 according to an embodiment of the disclosure.

Figure 19:
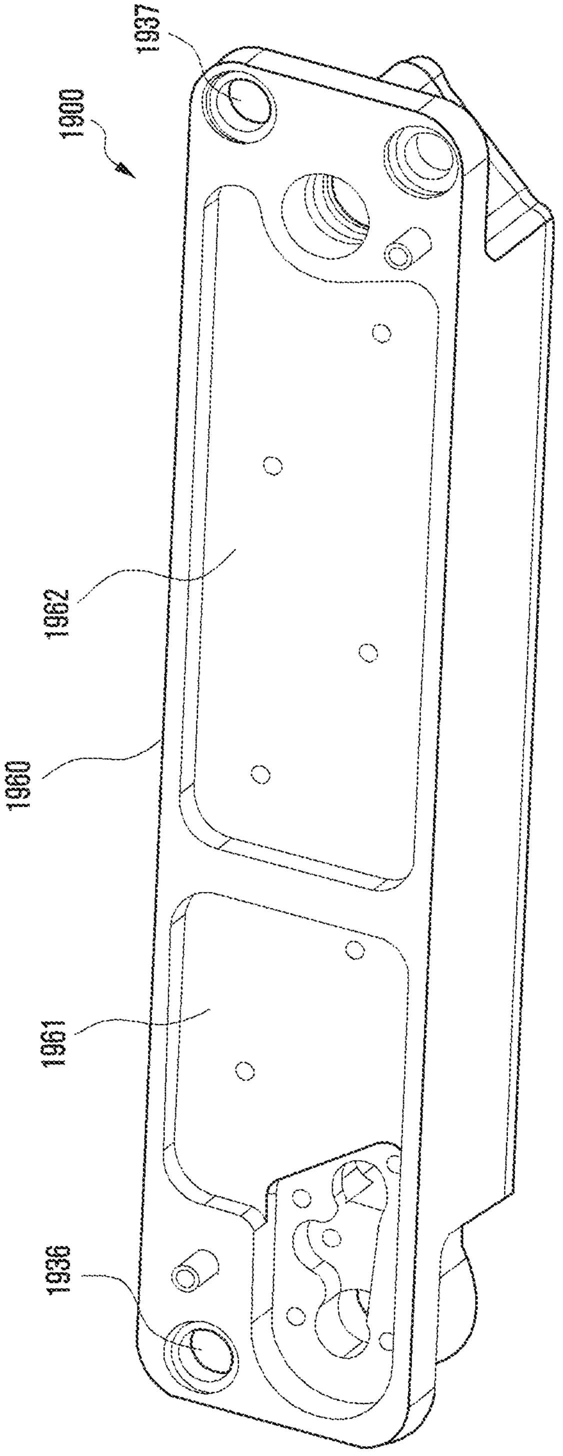
FIG. 19 is a conceptual diagram showing a filter of the MMU according to an embodiment of the disclosure.
Figure 20:
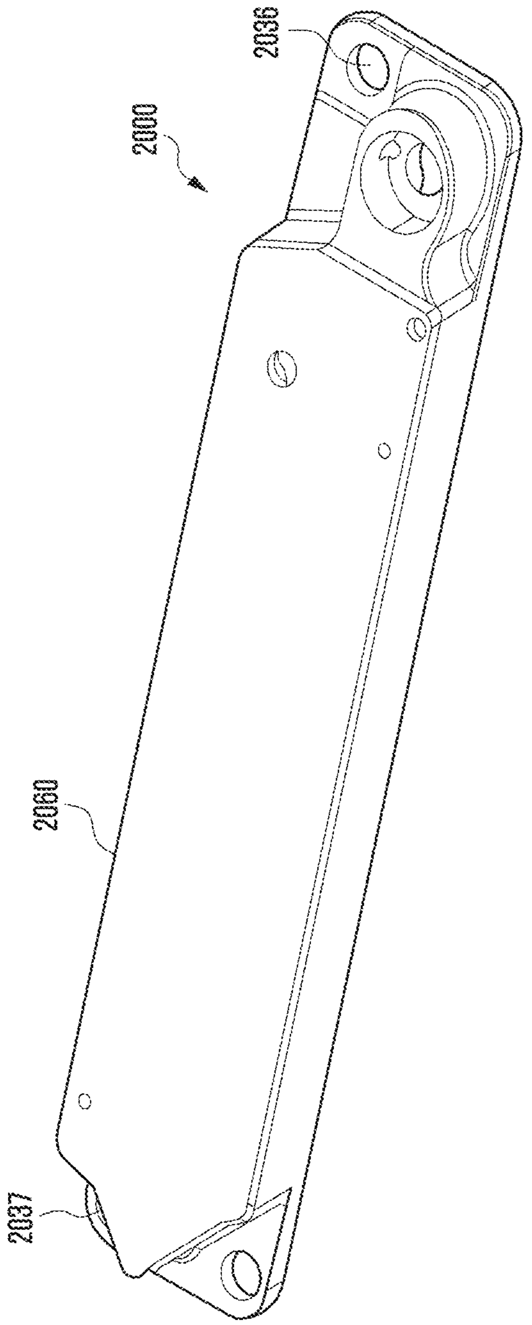
FIG. 20 is a conceptual diagram illustrating a filter of the MMU according to an embodiment of the disclosure.

Meanwhile, the other surface of the filter 1730 may be as shown in FIG. 19. One surface of the filter 1730 may be as shown in FIG. 20.

FIG. 19 is a perspective view illustrating an assembly structure of the MMU according to an embodiment of the disclosure.

With reference to FIG. 19, the filter 1960 of the MMU 1900 according to an embodiment of the disclosure may include a first groove 1961 and a second groove 1962. For example, the first groove 1961 and the second groove 1962 may be formed on the other surface of the filter 1960. The first groove 1961 may correspond to the first groove 1761 in FIG. 17. The second groove 1962 may correspond to the second groove 1762 in FIG. 17.

Also, the filter 1960 may include a second hole 1936 and a third hole 1937. The second hole 1936 may correspond to the second hole 1736 in FIG. 17. The third hole 1937 may correspond to the third hole 1737 in FIG. 17.

FIG. 20 is a perspective view showing an assembly structure of the MMU according to an embodiment of the disclosure.

With reference to FIG. 20, the filter 2060 of the MMU 2000 according to an embodiment of the disclosure may include a second hole 2036 and a third hole 2037. The second hole 2036 may correspond to the second hole 1936 in FIG. 19. The third hole 2037 may correspond to the third hole 1937 in FIG. 19.

Figure 21:
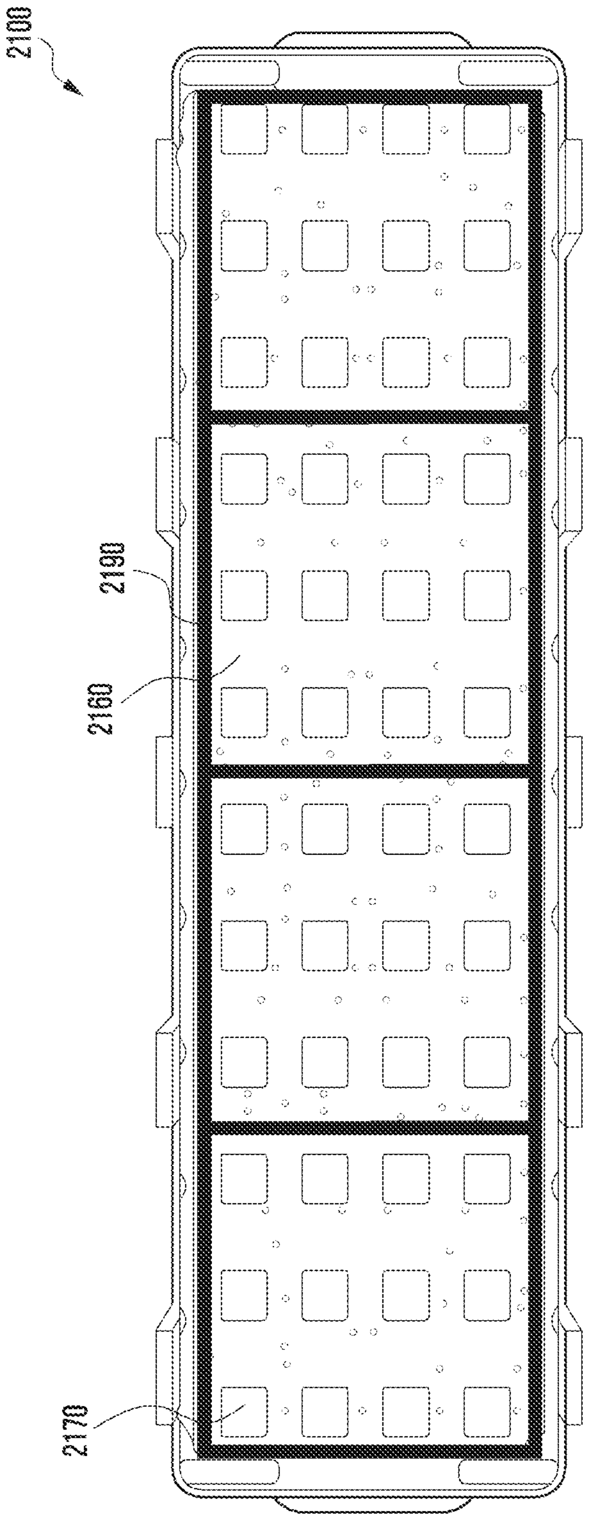
FIG. 21 is a conceptual diagram showing an assembly structure of the MMU according to an embodiment of the disclosure.

FIG. 21 is a conceptual diagram illustrating an assembly structure of the MMU according to an embodiment of the disclosure.

With reference to FIG. 21, the MMU 2100 according to an embodiment of the disclosure may include a plastic rivet 2190. For example, the plastic rivet 2190 may include a plurality of rivets. The plurality of rivets may correspond to the first rivet 665 and the second rivet 656 in FIG. 6. Also, the plurality of rivets may correspond to the rivet 1465 in FIG. 14.

The plastic rivet 2190 may be disposed in the form of a mesh in a region of one surface of the antenna PCB 2160 except for the region where the antenna array 2170 is mounted. The antenna PCB 2160 may be the same as or similar to the antenna PCB 660 in FIG. 6. The antenna array 2170 may correspond to the first antenna 671 and the second antenna 672 in FIG. 6.

The plastic rivet 2190 made of a plastic material does not affect the radiation characteristics of a signal radiated from the antenna array 2170, and enables the MMU 2100 to be effectively fixed and coupled.

The embodiments of the disclosure disclosed in the this specification and drawings are provided as specific examples to easily explain the technical contents of the disclosure and help the understanding of the disclosure, and are not intended to limit the scope of the disclosure. That is, it will be apparent to those of ordinary skill in the art to which the disclosure pertains that various modifications are possible based on the technical spirit of the disclosure. In addition, the above embodiments may be operated in combination with each other if necessary. For example, some of the methods proposed in the disclosure may be combined with each other and applied to the base station and the terminal.

INDUSTRIAL APPLICABILITY

The disclosure can be utilized in the electronics industry and the information and communications industry.

The invention claimed is:

1. An antenna unit comprising:

a radio unit (RU) printed circuit board (PCB);

a filter unit disposed on one surface of the RU PCB;

a calibration network PCB disposed on one surface of the filter unit;

a metal plate disposed on one surface of the calibration network PCB;

an antenna PCB disposed on one surface of the metal plate; and an antenna array mounted on one surface of the antenna PCB, wherein:

the metal plate includes a stand-off;

the calibration network PCB includes a hole through which the stand-off passes;

the stand-off includes a head and a body, the head being inserted into an insert region of the metal plate, and the body protruding in a direction of the one surface of the filter unit along the hole of the calibration network PCB;

the filter unit includes a screw that penetrates portions of the one surface and another surface of the filter unit and is coupled to the stand-off; and the stand-off and the screw fix and couple the metal plate, the calibration network PCB, and the filter unit.

2. The antenna unit of claim 1, wherein the metal plate includes a transmission line electrically connected to the filter unit, the calibration network PCB, the antenna PCB, and the antenna array.

3. The antenna unit of claim 2, wherein:

the metal plate includes a ground plane and a substrate disposed on one surface of the ground plane; and the transmission line is disposed on one surface of the substrate.

4. The antenna unit of claim 2, wherein:

the metal plate includes a first ground plane, a substrate disposed on one surface of the first ground plane, and a second ground plane disposed on one surface of the substrate;

the transmission line is inserted into an interior of the substrate.

5. The antenna unit of claim 1, wherein the calibration network PCB includes a circuit formed on the one surface of the calibration network PCB.

6. The antenna unit of claim 5, wherein the metal plate includes a groove that is formed on an other surface of the metal plate to shield the circuit.

7. The antenna unit of claim 1, wherein the calibration network PCB includes a circuit formed on an other surface of the calibration network PCB.

8. The antenna unit of claim 7, wherein the filter unit includes a groove that is formed on the one surface of the filter unit to shield the circuit.

9. The antenna unit of claim 1, wherein:

the antenna unit further comprises a plastic rivet;

the calibration network PCB includes a calibration hole coupled to the plastic rivet;

the metal plate includes a metal hole coupled to the plastic rivet;

the antenna PCB includes an antenna hole coupled to the plastic rivet; and the plastic rivet fixes and couples the calibration network, the metal plate, and the antenna PCB.

10. The antenna unit of claim 9, wherein:

the plastic rivet includes a plurality of rivets; and the plastic rivet is arranged in a mesh shape in a region of the one surface of the antenna PCB except for a region in which the antenna array is disposed.

11. The antenna unit of claim 1, further comprising an adhesive member that is disposed between the one surface of the metal plate and an other surface of the antenna PCB to bond the one surface of the metal plate and the other surface of the antenna PCB.

12. The antenna unit of claim 1, further comprising a metal shield can disposed between the one surface of the RU PCB and another surface of the filter unit.

13. The antenna unit of claim 1, wherein the RU PCB includes an RU connection terminal formed on the one surface of the RU PCB, and wherein the filter unit includes a filter connection terminal that is formed on another surface of the filter unit and is electrically connected to the RU connection terminal.

14. The antenna unit of claim 1, wherein the RU PCB includes an RU connection terminal formed on the one surface of the RU PCB, wherein the filter unit includes a filter hole exposing the RU connection terminal, and wherein the calibration network PCB includes a calibration connection terminal that is formed on another surface of the calibration network PCB and is electrically connected to the RU connection terminal through a space of the filter hole.

15. The antenna unit of claim 1, wherein the filter unit includes a filter connection terminal formed on the one surface of the filter unit, and wherein the calibration network PCB includes a calibration connection that is formed on another surface of the calibration network PCB and is electrically connected to the filter connection terminal.

16. The antenna unit of claim 1, wherein the calibration network PCB includes a calibration connection terminal formed on the one surface of the calibration network PCB, wherein the metal plate includes a metal plate hole that penetrates through the one surface and another surface of the metal plate to expose the calibration connection terminal, and wherein the antenna PCB includes an antenna PCB hole that penetrates through the one surface and another surface of the antenna PCB to expose the calibration connection terminal.

17. The antenna unit of claim 16, wherein a length of a diameter of the metal plate hole is the same as a length of a diameter of the antenna PCB hole.

* * * * *